US009003456B2

(12) United States Patent
Igoe et al.

(10) Patent No.: US 9,003,456 B2
(45) Date of Patent: Apr. 7, 2015

(54) PRESENTATION OF STILL IMAGE DATA ON DISPLAY DEVICES USING A WIRELESS HOME ENTERTAINMENT HUB

(71) Applicant: Porto Vinci Ltd. LLC, Wilmington, DE (US)

(72) Inventors: Patrick T. Igoe, Philadelphia, PA (US); Edward A. Ehrlacher, Philadelphia, PA (US)

(73) Assignee: Porto Vinci Ltd. Limited Liability Company, Wilmington, DE (US)

( * ) Notice: Subject to any disclaimer, the term of this patent is extended or adjusted under 35 U.S.C. 154(b) by 0 days.

(21) Appl. No.: 13/659,653

(22) Filed: Oct. 24, 2012

(65) Prior Publication Data
US 2013/0055330 A1 Feb. 28, 2013

Related U.S. Application Data

(60) Division of application No. 11/761,008, filed on Jun. 11, 2007, now Pat. No. 8,321,038, which is a continuation of application No. 11/624,755, filed on Jan. 19, 2007, which is a continuation-in-part of application No. 11/563,486, filed on Nov. 27, 2006, which is a continuation-in-part of application No. 11/470,862, filed on Sep. 7, 2006.

(51) Int. Cl.
*H04N 7/18* (2006.01)
*H04N 7/14* (2006.01)
(Continued)

(52) U.S. Cl.
CPC ............ *H04N 7/148* (2013.01); *H04L 12/2809* (2013.01); *H04L 12/2812* (2013.01); *H04L 12/2827* (2013.01); *H04L 12/2838* (2013.01);
(Continued)

(58) Field of Classification Search
CPC .................. H04N 21/43615; H04N 21/43632; H04N 21/43637; H04N 21/4622; H04N 21/4722; H04N 21/4725
USPC ..................................... 725/74, 78, 80–83, 85
See application file for complete search history.

(56) References Cited

U.S. PATENT DOCUMENTS

| 4,613,848 | A | 9/1986 | Watkins |
| 4,796,019 | A | 1/1989 | Auerbach |

(Continued)

FOREIGN PATENT DOCUMENTS

| EP | 893779 A1 * | 1/1999 |
| EP | 1550968 | 7/2005 |

(Continued)

OTHER PUBLICATIONS

Office Action issued by United States Patent and Trademark Office dated Aug. 23, 2010 in reference to U.S. Appl. No. 11/563,366.

(Continued)

*Primary Examiner* — Gigi L Dubasky
(74) *Attorney, Agent, or Firm* — Volpe and Koenig, P.C.

(57) ABSTRACT

A method of presenting still image data on multiple display devices using a wireless home entertainment hub comprises obtaining a registration of a plurality of devices with the wireless home entertainment hub, where the plurality of devices includes at least two display devices. An assignment of a zone for each display device of the at least two display devices is received. Still image data is caused to be displayed on a subset of the at least two display devices.

23 Claims, 18 Drawing Sheets

(51) Int. Cl.
*H04L 12/28* (2006.01)
*H04N 5/44* (2011.01)
*H04N 5/765* (2006.01)
*H04N 21/436* (2011.01)
*H04N 21/4363* (2011.01)
*H04W 84/18* (2009.01)
*H04W 52/02* (2009.01)
*H04N 21/41* (2011.01)
*H04N 21/4143* (2011.01)
*H04N 21/4782* (2011.01)
*H04N 21/485* (2011.01)
*H04N 21/81* (2011.01)
*H04N 5/60* (2006.01)
*H04W 4/06* (2009.01)
*H04W 8/00* (2009.01)
*H04W 8/26* (2009.01)
*H04W 48/08* (2009.01)
*H04W 60/00* (2009.01)
*H04N 21/442* (2011.01)
*H04N 21/4788* (2011.01)

(52) U.S. Cl.
CPC ............ *H04N 5/4403* (2013.01); *H04N 5/765* (2013.01); *H04N 21/43615* (2013.01); *H04N 21/43637* (2013.01); *H04W 84/18* (2013.01); *H04W 52/0254* (2013.01); *H04N 21/4108* (2013.01); *H04N 21/4122* (2013.01); *H04N 21/4143* (2013.01); *H04N 21/4782* (2013.01); *H04N 21/485* (2013.01); *H04N 21/8153* (2013.01); *H04L 2012/2841* (2013.01); *H04L 2012/2849* (2013.01); *H04N 5/602* (2013.01); *H04W 4/06* (2013.01); *H04W 8/005* (2013.01); *H04W 8/26* (2013.01); *H04W 48/08* (2013.01); *H04W 60/00* (2013.01); *H04N 21/44218* (2013.01); *H04N 21/4788* (2013.01); *H04N 21/812* (2013.01)

(56) References Cited

U.S. PATENT DOCUMENTS

| | | |
|---|---|---|
| 5,339,095 A | 8/1994 | Redford |
| 5,400,433 A | 3/1995 | Davis et al. |
| 5,481,265 A | 1/1996 | Russell |
| 5,598,187 A | 1/1997 | Ide et al. |
| 5,757,360 A | 5/1998 | Nitta et al. |
| 5,793,409 A | 8/1998 | Tetsumura |
| 5,923,318 A | 7/1999 | Zhai et al. |
| 5,973,683 A | 10/1999 | Cragun et al. |
| 6,008,836 A | 12/1999 | Bruck et al. |
| 6,032,202 A | 2/2000 | Lea et al. |
| 6,038,545 A | 3/2000 | Mandeberg et al. |
| 6,097,441 A | 8/2000 | Allport |
| 6,122,386 A | 9/2000 | Wiley |
| 6,130,664 A | 10/2000 | Suzuki |
| 6,131,130 A | 10/2000 | Van Ryzin |
| 6,205,430 B1 | 3/2001 | Hui |
| 6,219,839 B1 | 4/2001 | Sampsell |
| 6,279,029 B1 | 8/2001 | Sampat et al. |
| 6,297,805 B1 | 10/2001 | Adler et al. |
| 6,353,929 B1 | 3/2002 | Houston |
| 6,430,605 B2 | 8/2002 | Hunter |
| 6,481,013 B1 | 11/2002 | Dinwoddie et al. |
| 6,567,984 B1 | 5/2003 | Allport |
| 6,665,020 B1 | 12/2003 | Stahl et al. |
| 6,747,632 B2 | 6/2004 | Howard |
| 6,845,097 B2 | 1/2005 | Haller et al. |
| 6,868,292 B2 | 3/2005 | Ficco et al. |
| 6,886,095 B1 | 4/2005 | Hind et al. |
| 6,904,451 B1 | 6/2005 | Orfitelli et al. |
| 6,907,301 B2 | 6/2005 | Kou et al. |
| 6,918,084 B1 | 7/2005 | Slaughter et al. |
| 6,967,588 B2 | 11/2005 | Zustak et al. |
| 7,038,581 B2 | 5/2006 | Kendall et al. |
| 7,098,869 B2 | 8/2006 | Vaitekunas et al. |
| 7,136,709 B2 | 11/2006 | Arling et al. |
| 7,139,981 B2 | 11/2006 | Mayer et al. |
| 7,146,567 B1 | 12/2006 | Duczmal et al. |
| 7,200,855 B2 | 4/2007 | Laksono |
| 7,231,605 B1 | 6/2007 | Ramakesavan |
| 7,234,115 B1 | 6/2007 | Sprauve et al. |
| 7,271,932 B2 | 9/2007 | Izumi |
| 7,301,900 B1 | 11/2007 | Laksono |
| 7,310,808 B2 | 12/2007 | Kou |
| 7,327,385 B2 | 2/2008 | Yamaguchi |
| 7,336,801 B2 | 2/2008 | Mehrotra et al. |
| 7,356,091 B2 | 4/2008 | Liu |
| 7,436,300 B2 | 10/2008 | Glass et al. |
| 7,447,317 B2 | 11/2008 | Herre et al. |
| 7,460,827 B2 | 12/2008 | Schuster et al. |
| 7,493,645 B1 | 2/2009 | Tranchina |
| 7,505,889 B2 | 3/2009 | Salmonsen et al. |
| 7,617,515 B1 | 11/2009 | Laksono |
| 7,631,327 B2 | 12/2009 | Dempski et al. |
| 7,657,907 B2 | 2/2010 | Fennan et al. |
| 7,784,071 B2 | 8/2010 | Vince et al. |
| 7,827,312 B2 | 11/2010 | Ramaswamy et al. |
| 8,031,272 B2 | 10/2011 | Blatchley et al. |
| 2001/0009424 A1 | 7/2001 | Sekiguchi |
| 2001/0021655 A1 | 9/2001 | Maeshima |
| 2001/0028655 A1 | 10/2001 | Noda et al. |
| 2002/0039479 A1 | 4/2002 | Watanabe et al. |
| 2002/0056089 A1 | 5/2002 | Houston |
| 2002/0062417 A1 | 5/2002 | Rudland et al. |
| 2002/0065564 A1 | 5/2002 | Sheriff et al. |
| 2002/0107737 A1 | 8/2002 | Kaneko et al. |
| 2002/0144259 A1 | 10/2002 | Gutta et al. |
| 2002/0156858 A1 | 10/2002 | Hunter |
| 2002/0194596 A1 | 12/2002 | Srivastava |
| 2002/0196275 A1 | 12/2002 | Willner et al. |
| 2003/0018977 A1 | 1/2003 | McKenna |
| 2003/0037333 A1 | 2/2003 | Ghashghai et al. |
| 2003/0041333 A1 | 2/2003 | Allen et al. |
| 2003/0056213 A1 | 3/2003 | McFaddin et al. |
| 2003/0063432 A1 | 4/2003 | Farrow et al. |
| 2003/0066080 A1 | 4/2003 | Kamieniecki |
| 2003/0072273 A1 | 4/2003 | Aiello et al. |
| 2003/0074665 A1 | 4/2003 | Varley |
| 2003/0075983 A1 | 4/2003 | Stecyk et al. |
| 2003/0081834 A1 | 5/2003 | Philomin et al. |
| 2003/0161479 A1 | 8/2003 | Yang et al. |
| 2004/0012810 A1 | 1/2004 | Haas et al. |
| 2004/0015575 A1 | 1/2004 | Motoyama |
| 2004/0015983 A1 | 1/2004 | Lemmons |
| 2004/0024867 A1 | 2/2004 | Kjellberg |
| 2004/0049797 A1 | 3/2004 | Salmonsen |
| 2004/0117619 A1 | 6/2004 | Singer et al. |
| 2004/0117833 A1 | 6/2004 | Karaoguz et al. |
| 2004/0119894 A1 | 6/2004 | Higgins et al. |
| 2004/0176117 A1 | 9/2004 | Strittmatter et al. |
| 2004/0210926 A1 | 10/2004 | Francis et al. |
| 2004/0244032 A1 | 12/2004 | Yamada |
| 2004/0264704 A1 | 12/2004 | Huin et al. |
| 2005/0005297 A1 | 1/2005 | Lee |
| 2005/0020262 A1 | 1/2005 | Kim |
| 2005/0022244 A1 | 1/2005 | Scheelke |
| 2005/0034147 A1 | 2/2005 | Best et al. |
| 2005/0034160 A1 | 2/2005 | Kim et al. |
| 2005/0052412 A1 | 3/2005 | McRae et al. |
| 2005/0108760 A1 | 5/2005 | Iwamura |
| 2005/0120381 A1 | 6/2005 | Yamaguchi |
| 2005/0132408 A1 | 6/2005 | Dahley et al. |
| 2005/0138663 A1 | 6/2005 | Throckmorton et al. |
| 2005/0165795 A1 | 7/2005 | Myka et al. |
| 2005/0165965 A1 | 7/2005 | Henry et al. |
| 2005/0166241 A1 | 7/2005 | Kim et al. |
| 2005/0174302 A1 | 8/2005 | Ishii |
| 2005/0179618 A1 | 8/2005 | Oh |
| 2005/0188406 A1 | 8/2005 | Gielow et al. |
| 2005/0210101 A1 | 9/2005 | Janik |

(56) References Cited

U.S. PATENT DOCUMENTS

| | | | |
|---|---|---|---|
| 2005/0212767 | A1 | 9/2005 | Marvit et al. |
| 2005/0216867 | A1 | 9/2005 | Marvit et al. |
| 2005/0235329 | A1 | 10/2005 | Karaoguz et al. |
| 2005/0240978 | A1 | 10/2005 | Bowern et al. |
| 2005/0246746 | A1 | 11/2005 | Yui et al. |
| 2005/0257052 | A1 | 11/2005 | Asai et al. |
| 2005/0278462 | A1 | 12/2005 | Gillespie |
| 2006/0020960 | A1 | 1/2006 | Relan et al. |
| 2006/0031889 | A1 | 2/2006 | Bennett et al. |
| 2006/0034469 | A1 | 2/2006 | Tamiya et al. |
| 2006/0044268 | A1 | 3/2006 | Robin et al. |
| 2006/0048194 | A1 | 3/2006 | Poslinski |
| 2006/0050142 | A1 | 3/2006 | Scott et al. |
| 2006/0053472 | A1* | 3/2006 | Goto et al. ............... 725/141 |
| 2006/0061149 | A1 | 3/2006 | Tsai |
| 2006/0064720 | A1 | 3/2006 | Istvan et al. |
| 2006/0074769 | A1 | 4/2006 | Looney et al. |
| 2006/0079245 | A1 | 4/2006 | Moed |
| 2006/0080408 | A1 | 4/2006 | Istvan et al. |
| 2006/0085825 | A1 | 4/2006 | Istvan et al. |
| 2006/0092037 | A1 | 5/2006 | Neogi et al. |
| 2006/0105712 | A1 | 5/2006 | Glass et al. |
| 2006/0107281 | A1 | 5/2006 | Dunton |
| 2006/0142900 | A1 | 6/2006 | Rothman et al. |
| 2006/0143572 | A1 | 6/2006 | Scott et al. |
| 2006/0152477 | A1 | 7/2006 | Noda et al. |
| 2006/0190974 | A1 | 8/2006 | Lee |
| 2006/0221934 | A1 | 10/2006 | Cooke et al. |
| 2006/0236344 | A1 | 10/2006 | Brain et al. |
| 2006/0247983 | A1 | 11/2006 | Dalli |
| 2006/0248557 | A1 | 11/2006 | Stark et al. |
| 2006/0294537 | A1 | 12/2006 | Weinblatt |
| 2007/0002784 | A1 | 1/2007 | Edwards |
| 2007/0016931 | A1 | 1/2007 | Ichioka et al. |
| 2007/0033607 | A1 | 2/2007 | Bryan |
| 2007/0056000 | A1 | 3/2007 | Pantalone et al. |
| 2007/0058820 | A1 | 3/2007 | Sawara et al. |
| 2007/0121954 | A1 | 5/2007 | Kim et al. |
| 2007/0124785 | A1 | 5/2007 | Marsico |
| 2007/0136768 | A1 | 6/2007 | Kumar |
| 2007/0136778 | A1 | 6/2007 | Birger et al. |
| 2007/0142022 | A1* | 6/2007 | Madonna et al. ............. 455/352 |
| 2007/0143801 | A1 | 6/2007 | Madonna et al. |
| 2007/0156521 | A1 | 7/2007 | Yates |
| 2007/0199035 | A1 | 8/2007 | Schwartz et al. |
| 2007/0250853 | A1 | 10/2007 | Jain et al. |
| 2007/0250900 | A1 | 10/2007 | Marcuvitz |
| 2007/0294556 | A1 | 12/2007 | Wutka |
| 2008/0004954 | A1 | 1/2008 | Horvitz |
| 2008/0022360 | A1 | 1/2008 | Bacastow |
| 2008/0039086 | A1 | 2/2008 | Gallagher et al. |
| 2008/0040759 | A1 | 2/2008 | She et al. |
| 2008/0072292 | A1 | 3/2008 | Narjala |
| 2008/0092201 | A1 | 4/2008 | Agarwal et al. |
| 2008/0109848 | A1 | 5/2008 | Li et al. |
| 2008/0120369 | A1 | 5/2008 | Gustavsson |
| 2008/0120667 | A1 | 5/2008 | Zaltsman |
| 2008/0130912 | A1 | 6/2008 | Marlowe |
| 2009/0052688 | A1 | 2/2009 | Ishibashi et al. |
| 2009/0256855 | A1 | 10/2009 | Tran |
| 2009/0270085 | A1 | 10/2009 | Jones et al. |
| 2010/0083306 | A1 | 4/2010 | Dempski et al. |
| 2010/0093286 | A1 | 4/2010 | Noda et al. |
| 2010/0107184 | A1 | 4/2010 | Shintani |
| 2012/0198499 | A1* | 8/2012 | Louie et al. ................ 725/60 |

FOREIGN PATENT DOCUMENTS

| | | |
|---|---|---|
| WO | 2004061699 | 7/2004 |
| WO | 2007028094 A1 | 3/2007 |
| WO | 2008059325 | 5/2008 |

OTHER PUBLICATIONS

Office Action issued by United States Patent and Trademark Office dated Mar. 16, 2010 in reference to U.S. Appl. No. 11/535,232.
Office Action issued by United States Patent and Trademark Office dated Jan. 6, 2010 in reference to U.S. Appl. No. 11/470,862.
Office Action issued by United States Patent and Trademark Office dated Sep. 2, 2010 in reference to U.S. Appl. No. 11/563,520.
Office Action issued by United States Patent and Trademark Office dated Sep. 1, 2010 in reference to U.S. Appl. No. 11/563,486.
Office Action issued by United States Patent and Trademark Office dated Nov. 26, 2010 in reference to U.S. Appl. No. 11/760,079.
Office Action issued by United States Patent and Trademark Office dated Jan. 21, 2011 in reference to U.S. Appl. No. 11/930,414.
Office Action issued by United States Patent and Trademark Office dated Feb. 2, 2011 in reference to U.S. Appl. No. 11/930,470.
Office Action issued by United States Patent and Trademark Office dated Nov. 13, 2009 in reference to U.S. Appl. No. 11/535,211.
Office Action issued by United States Patent and Trademark Office dated Oct. 7, 2009 in reference to U.S. Appl. No. 11/535,216.
Office Action issued by United States Patent and Trademark Office dated Dec. 23, 2009 in reference to U.S. Appl. No. 11/761,011.
Office Action issued by United States Patent and Trademark Office dated Dec. 8, 2010 in reference to U.S. Appl. No. 11/470,872.
Office Action issued by United States Patent and Trademark Office dated Oct. 4, 2010 in reference to U.S. Appl. No. 11/563,503.
Office Action issued by United States Patent and Trademark Office dated Dec. 8, 2010 in reference to U.S. Appl. No. 11/624,755.
Office Action issued by United States Patent and Trademark Office dated Feb. 15, 2011 in reference to U.S. Appl. No. 11/563,520.
Office Action issued by United States Patent and Trademark Office dated Mar. 17, 2011 in reference to U.S. Appl. No. 11/761,001.
Office Action issued by United States Patent and Trademark Office dated Mar. 15, 2011 in reference to U.S. Appl. No. 11/761,008.
Office Action issued by United States Patent and Trademark Office dated Apr. 15, 2011 in reference to U.S. Appl. No. 11/470,895.
Office Action issued by United States Patent and Trademark Office dated Apr. 19, 2011 in reference to U.S. Appl. No. 11/930,470.
Office Action issued by United States Patent and Trademark Office dated May 10, 2011 in reference to U.S. Appl. No. 11/930,435.
Kobla, V.; DeMenthon, D.; Doermann, D.; "Detection of slow-motion replay sequences for identifying sports videos," Multimedia Signal Processing, 1999 IEEE 3rd Workshop on, vol., No., pp. 135-140.
Jae-Chang Shim; Dorai, C.; Bolle, R.;, "Automatic text extraction from video for content-based annotation and retrieval," Pattern Recognition, 1998. Proceedings. Fourteenth International Conference on, vol. 1, No., pp. 618-620 vol. 1, Aug. 16-20, 1998.
Web pages: Apple—AirPort Express, Introducing Airport Express with AirTunes, www.apple.com/airportexpress ; Oct. 5, 2006; 4 pgs.
Web pages: Logitech® Harmony® 890 Advanced Universal Remote, www.logitech.com/index.cfm/products/detailsharmony Oct. 5, 2006; 2 pgs.
Airport Express, Technology Overview, www.images.apple.com/airportexpress/pdfs Jul. 2004; 31 pgs.
Web pages: Linksys® WMCE54AG, www.linksys.com/servlet/Satellite?c=L-Product, Oct. 5, 2006, 2 pgs.
Logitech Innovation Brief, Dual Wireless Rear Speakers, www.logitech.com/lang/pdf/logitech_Z_5450_Speakers.pdf Oct. 5, 2006 2 pgs.
Web pages: Sling Media—SlingPlayer, www.us.slingmedia.com/page/slingplayer.html Oct. 5, 2006, 3 pgs.
Web pages: Sonos, How Sonos Works, www.sonos.com/productshow_sonos_works.html Oct. 5, 2006, 1 pg.
Web pages: Sonos—Products, www.sonos.com/products/index.html Oct. 5, 2006, 2 pgs.
Web pages: Sonos—Sonos Setup, www.sonos.com/products/sonos_setup_html Oct. 5, 2006 1 pg.
Web pages: Sonos—ZonePlayers, www.sonos.com/zoneplayers Oct. 5, 2006, 1 pg.
Web Pages: SonyStyle USA—LocationFree Wireless Base Station, www.sonystyle.com/isbin/intershop.enfinity Oct. 20, 2006 2 pgs.

(56) References Cited

OTHER PUBLICATIONS

Web pages: SonyStyle—Audio Video Receiver STR-DG800, www.sonystyle.com/isbin/intershop.enfinity Oct. 5, 2006, 3 pgs.
Web pages: Logitech® Z-5450 Digital 5.1 Speaker System, www.logitech.com/index.cfm/products, Oct. 5, 2006, 2 pgs.
Web pages: Press Release, Tzero Teams with Analog Devices to Enable Wireless High-Definition Video, Tzero Technologies, www.tzerotech.com/site/content/pr_106.html Oct. 5, 2006, 4 pgs.
Web pages: X10 Audio Video Sender Internet Special, www.x10.com/products/x30_vk30A.html Oct. 5, 2006, 9 pgs.
Web page; Panasonic's SH-FX85 wireless sound system: thanks FCC, http://www.engadget.com/2007/01/19/panasonics-sh-fx85-wireless-sound-system-thanks-fcc, Jan. 19, 2007, 1 pg.
Web pages: "Home Audio without the Wires", http://news.com.com/home+audio+without+the+wires/2100-1041_3-6142125.html, Dec. 12, 2006, 3 pgs.
Web pages: Neosonik All-Digital Wireless Home Theater System Unveiled, http://news.com.com/home+audio+without+the+wires/2100-1041_3-6142125.html, Dec. 23, 2006, 3 pgs.
Office Action issued by the United States Patent and Trademark Office dated Oct. 9, 2013 in reference to U.S. Appl. No. 11/563,486, 17 pp.
Office Action issued by the United States Patent and Trademark Office dated Nov. 22, 2013 in reference to U.S. Appl. No. 11/535,211, 33 pp.
Final Rejection, U.S. Appl. No. 11/563,486, dated Feb. 25, 2014.
Non-Final Rejection, U.S. Appl. No. 13/785,569, dated Apr. 18, 2014.
Non-Final Rejection, U.S. Appl. No. 14/261,742, dated Jul. 21, 2014.
Non-Final Rejection, U.S. Appl. No. 14/211,691, dated Jul. 30, 2014.
Non-Final Rejection, U.S. Appl. No. 11/535,216, dated Sep. 11, 2014.

* cited by examiner

PRESENTATION OF STILL IMAGE DATA ON DISPLAY DEVICES USING A WIRELESS HOME ENTERTAINMENT HUB

CROSS REFERENCE TO RELATED APPLICATIONS

This application is a divisional of U.S. patent application Ser. No. 11/761,008, entitled Presentation of Still Image Data on Display Devices Using a Wireless Home Entertainment Hub, filed on Jun. 11, 2007, which is a continuation of U.S. patent application Ser. No. 11/624,755, entitled Presentation of Data on Multiple Display Devices Using a Wireless Home Entertainment Hub, filed Jan. 19, 2007, which is a continuation-in-part of co-pending U.S. patent application Ser. No. 11/563,486, entitled Inventory of Home Entertainment System Devices Using a Wireless Home Entertainment Hub, filed Nov. 27, 2006, which is a continuation-in-part of U.S. patent application Ser. No. 11/470,862, entitled Data Presentation Using a Wireless Home Entertainment Hub, filed Sep. 7, 2006, the entire disclosures of which are incorporated herein by reference.

This application is related to co-pending U.S. patent application Ser. No. 11/761,001, entitled Calibration of a Home Entertainment System Using a Wireless Home Entertainment Hub, filed, Jun. 11, 2007, U.S. patent application Ser. No. 11/761 011, entitled Data Presentation by User Movement in Multiple Zones Using a Wireless Home Entertainment Hub, filed Jun. 11 2007, U.S. patent application Ser. No. 11/470, 872, entitled Control of Data Presentation Using a Wireless Home Entertainment Hub, filed Sep. 7, 2006, U.S. patent application Ser. No. 11/470,879, entitled Data Presentation from Multiple Sources using a Wireless Home Entertainment Hub, filed Sep. 7, 2006, U.S. application Ser. No. 11/470,895, entitled Control of Data Presentation from Multiple Sources Using a Wireless Home Entertainment Hub, filed Sep. 7, 2006, U.S. patent application Ser. No. 11/535,211, entitled Device Registration Using a Wireless Home Entertainment Hub, filed Sep. 26, 2006 U.S. patent application Ser. No. 11/535,216, entitled User Directed Device Registration Using a Wireless Home Entertainment Hub, filed Sep. 26, 2006, U.S. patent application Ser. No. 11/535,232, entitled Source Device Change using a Wireless Home Entertainment Hub, filed Sep. 26, 2006, U.S. application Ser. No. 11/563, 366, entitled Control of Access to Data Using a Wireless Home Entertainment Hub, filed Nov. 27, 2006, U.S. patent application Ser. No. 11/760,075, entitled Remote Control Operation Using a Wireless Home Entertainment Hub, filed Jun. 8, 2007, U.S. patent application Ser. No. 11/760,119, entitled Audio Control Using a Wireless Home Entertainment Hub, filed Jun. 8, 2007, U.S. patent application Ser. No. 11/760,121, entitled Power Management Using a Wireless Home Entertainment Hub, filed Jun. 8, 2007, U.S. application Ser. No. 11/563,520, entitled Connecting a Legacy Device into a Home Entertainment System Using a Wireless Home Entertainment Hub, filed Nov. 27, 2006, U.S. application Ser. No. 11/563,530, entitled Data Presentation in Multiple Zones Using a Wireless Home Entertainment Hub, filed Nov. 27, 2006, and U.S. application Ser. No. 11/563,503, entitled Control of Data Presentation in Multiple Zones Using a Wireless Home Entertainment Hub, filed Nov. 27, 2006, the entire disclosures of which are incorporated herein by reference.

BRIEF DESCRIPTION OF THE DRAWINGS

The following detailed description will be better understood when read in conjunction with the appended drawings, in which there is shown one or more of the multiple embodiments of the present invention. It should be understood, however, that the various embodiments of the present invention are not limited to the precise arrangements and instrumentalities shown in the drawings.

In the Drawings.

DETAILED DESCRIPTION

Figure 1:
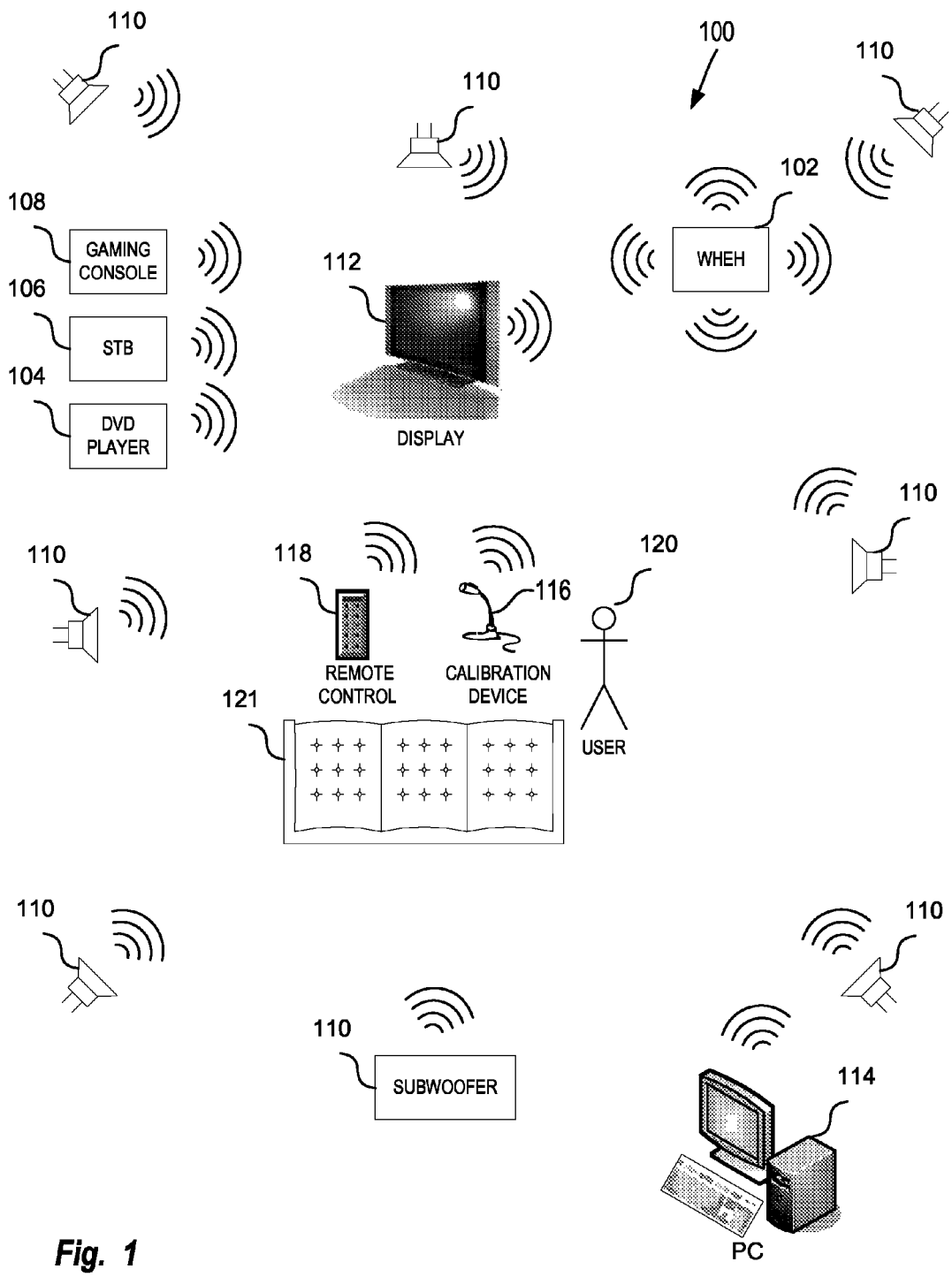
FIG. 1 is a system diagram of a home entertainment system according to one embodiment of the present invention.

Certain terminology is used herein for convenience only and is not to be taken as a limitation on the embodiments of the present invention. In the drawings, the same reference letters are employed for designating the same elements throughout the several figures.

The words "right", "left", "lower" and "upper" designate directions in the drawings to which reference is made. The words "inwardly" and "outwardly" refer to directions toward and away from, respectively, the geometric center of the home entertainment system and designated parts thereof. The terminology includes the words above specifically mentioned, derivatives thereof and words of similar import.

Unified Modeling Language ("UML") can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the embodiments of the present invention, but do not constrain implementation thereof to any particular hardware or software embodiments. Unless otherwise noted, the notation used with respect to the UML diagrams contained herein is consistent with the UML 2.0 specification or variants thereof and is understood by those skilled in the art.

An exemplary home entertainment system (HES) 100 including wirelessly connected devices in accordance with one embodiment of the present invention is shown in FIG. 1. Interactions between the various wireless devices in the HES 100 and a user 120 are coordinated by a wireless home entertainment hub (WHEH) 102. It is understood by those skilled in the art that a wireless device in the HES 100 may contain an external wire for the purpose of supplying power to the wireless device.

Figure 2:
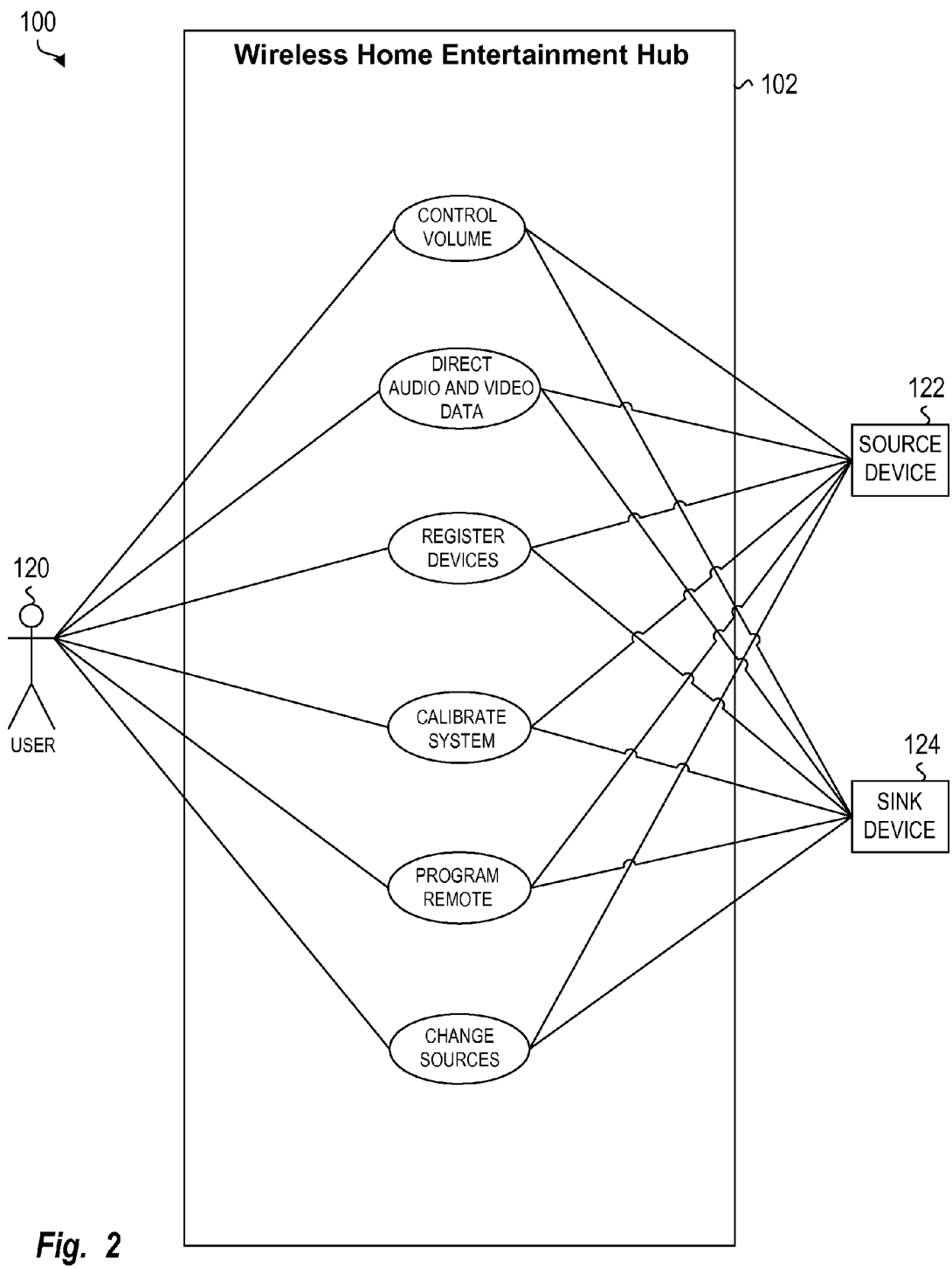
FIG. 2 is a use-case diagram of a wireless home entertainment hub in accordance with the home entertainment system of FIG. 1.

Referring generally to FIGS. 1 and 2, devices in the HES 100 can broadly be classified into two categories: source devices 122 and sink devices 124. Source devices 122 transmit data within the HES 100. Source devices 122 include, but are not limited to, DVD players 104, digital video recorders (DVR) (not shown), set-top boxes (STB) 106 (e.g., cable or satellite channel tuners), gaming consoles 108 (e.g. Xbox®, PlayStation®), CD players or other audio playback devices (e.g., MP3 player) (not shown). It is understood by those skilled in the art that external data can be introduced into the HES 100 for transmission by one or more of the source devices 122 by various means, such as optical fiber, co-axial cable, or a satellite dish system connected to the STB 106. Sink devices 124 receive the transmitted data within the HES 100, sometimes converting a signal into an audible or visible stimulus. Sink devices 124 include, but are not limited to, speakers 110, audio/visual receivers (AVR) 145 (see FIG. 9), and display devices 112 such as an HDTV or other television, monitor, or display screen or mechanism.

Those skilled in the art will recognize that a PC 114 can act as a source device 122 and/or a sink device 124 within the HES 100. The PC 114 can act ad an audio and/or a video source transmitting data from, for example, a CD, DVD, stored music and video media, or data accessed from the Internet. The PC 114 can also act as a sink device 124 displaying video and audio data from, for example, the DVD player 104 or STB 106.

The HES 100 may also utilize a remote control 118 and a calibration device 116, discussed in greater detail below.

The WHEH 102 facilitates the transfer of data between the source and sink devices in the HES 100, as well as coordinates the interaction between the user 120 and the source and sink devices 122, 124. For example, referring to FIG. 2, the WHEH 102 may perform a register devices use-case, change source use-case, direct audio and video signal use-case, program remote use-case, control volume use-case, and calibrate system use-case, which are described in more detail below.

Within the HES 100, the WHEH 102 controls the flow of data, information and other "traffic" by recognizing the devices within the HES 100, tracking their current status (e.g., active, standby, etc.), directing the transfer of data between devices, etc. In addition, the WHEH 102 provides a central controller for the HES 100 that allows a user 120 to operate the HES 100 in an efficient manner through interaction with the WHEH 102, which then subsequently provides instructions to the other devices in the HES 100 to perform the function requested by the user 120. Such interactions with the WHEH 102 by the user may be performed through with a visual user interface presented on the screen of the display device 112. Alternately, the remote control 118 may include a display screen, such as an LCD, to present the user with a visual interface to the WHEH 102.

The WHEH 102 includes one or more wireless transceiver units to facilitate the wireless transfer of data between the source and sink devices 122, 124 using wireless communication standards described below, a memory for storing data and other information generally used in the operation of the HES 100, and a processor for executing the instruction sets for the functions of performed by the WHEH 102, including the use-cases listed above. The WHEH 102 may exist as a standalone unit or it may be integrated into another device. For example, the WHEH may be included in the display device 112 or the remote control 118. One skilled in the art will recognize that the WHEH 102 can act as a source device 122 and/or a sink device 124 in the HES 100. For example, the WHEH 102 may receive data (i.e., acts as a sink unit) from a source unit currently transmitting data in the HES 100, and process and transmit that data (i.e., acts as a source unit) to other sink devices in the HES 100 for presentation to a user 120.

Ultra-wide band technology (UWB) utilizing orthogonal frequency division multiplexing (OFDM) or a direct sequence communication system may be used for the wireless communication between the WHEH 102 and the source and sink devices 122, 124 in the HES 100. Those skilled in the art will recognize that a number of other wireless commutation standards, including Bluetooth and various WiFi standards, can be used without departing from the spirit and scope of multiple embodiments of the present invention for transfer of data between devices within the HES 100. In one embodiment, more than one wireless standard may be utilized within the HES 100 to facilitate data transfer between the devices. For example, the WHEH 102 and source and sink devices 122, 124 may each contain a UWB transceiver for transfer of audio and/or video data and a WiFi transceiver for transferring operation instructions.

Figure 3:
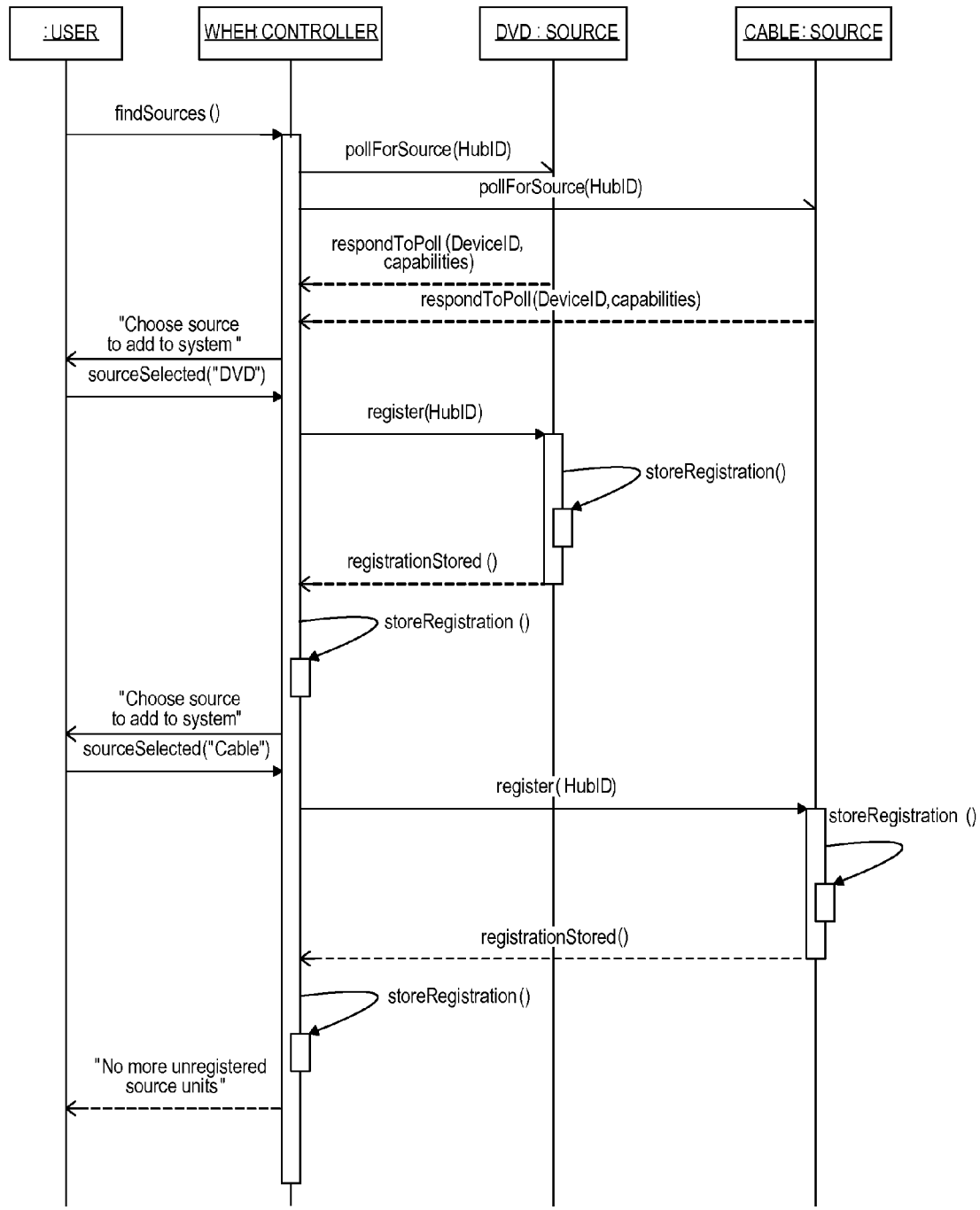
FIG. 3 is a sequence diagram of user-initiated automatic registration in accordance with the home entertainment system of FIG. 1.
Figure 4:
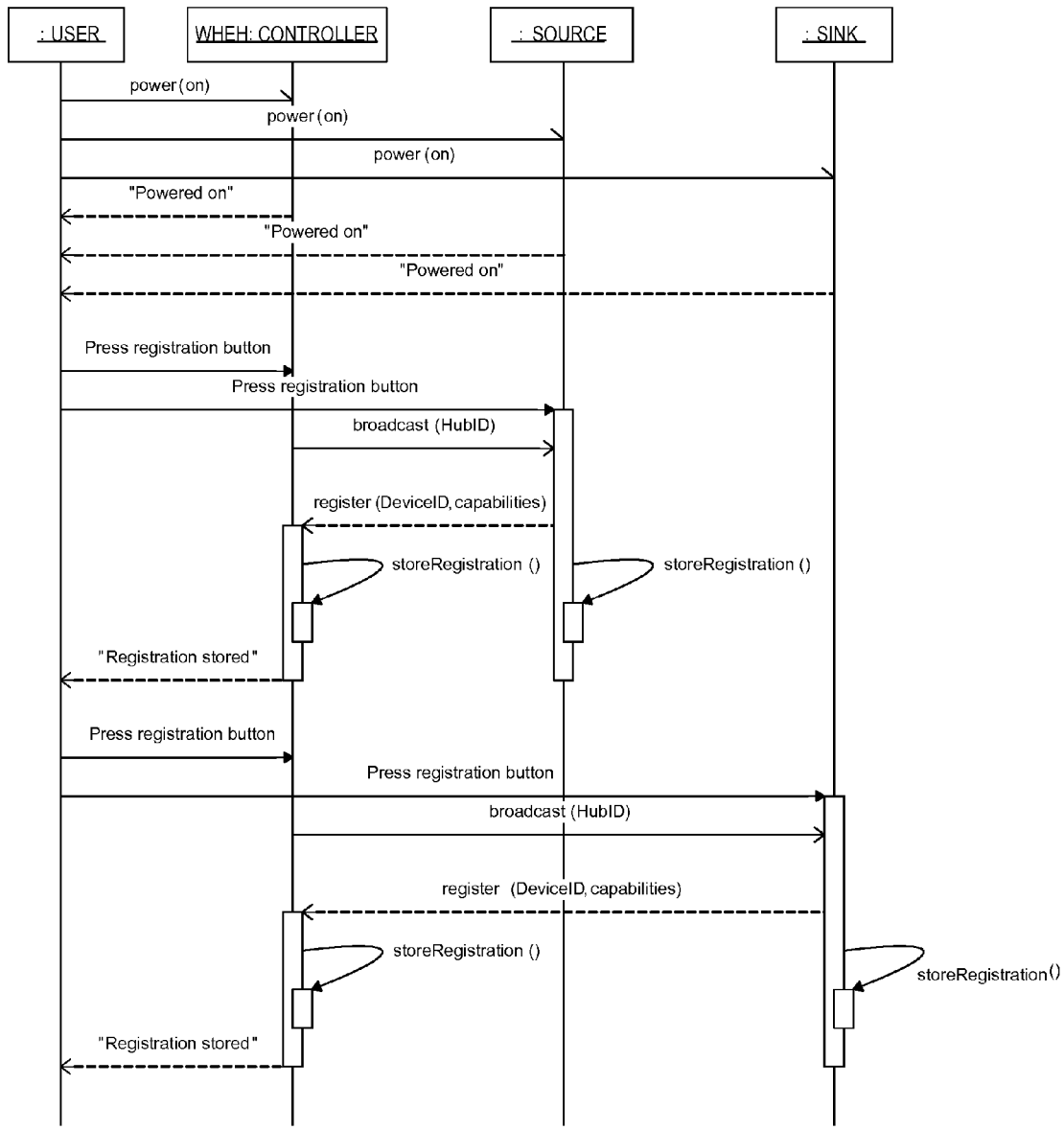
FIG. 4 is a sequence diagram of manual device registration in accordance with the home entertainment system of FIG. 1.

Referring generally to FIGS. 2-4, audio and video devices in the HES 100 can be registered with the WHEH 102. The registration creates a unique association between devices and the WHEH 102 such that registered devices belonging to the HES 100 are controlled by WHEH 102, and cannot simultaneously be registered with a different home entertainment system or another wireless home entertainment hub operating in a nearby proximity, such as in a neighboring apartment or household.

User-Initiated Automatic Registration

Figure 13:
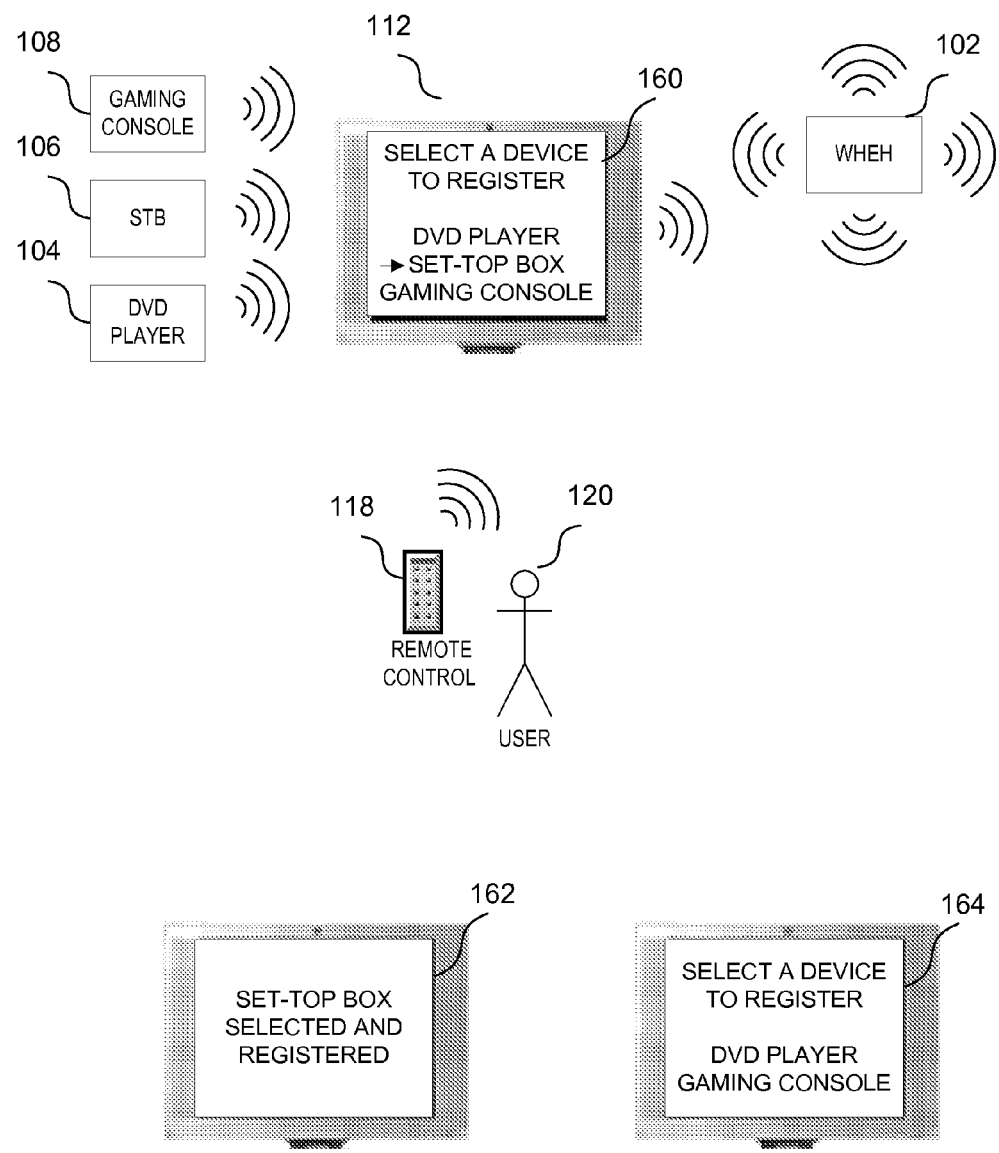
FIG. 13 illustrates a series of exemplary user interface display device screens for registering devices in accordance with the home entertainment system of FIG. 1.

Referring to FIG. 3, the user 120 initiates the registration procedure. The WHEH 102 sends a request for any unregistered device to respond. The WHEH 102 request may include a unique identifier for the WHEH 102, such as a WHEH ID number. A device response includes a unique device identifier, such as a device ID number. Referring to FIG. 13, a list of responding devices 160 is presented to the user 120, and the user 120 selects the device that is to be registered with WHEH 102. The WHEH 102 sends a registration instruction to the selected device and the registration is stored on both the device and the WHEH 102. Once a registration has been established 162, the device is removed from the list 164, and the registration process is repeated for the remaining unregistered devices within the HES 100 that have responded to the WHEH 102.

In an alternate embodiment, the registration procedure is accomplished automatically between the WHEH 102 and unregistered devices. For example, the WHEH 102 may periodically broadcast a request for any unregistered devices to report. In addition to replying with the device ID number, an unregistered device can respond with a list of its capabilities so that the WHEH 102 can determine the functionality of the device (i.e., if it is a DVD player, DVR, STB, etc.) before sending a registration instruction. Alternately, the unregistered device can respond with its make and model number from which the WHEH 102 can determine the functionality of the device using an internal database of devices and also obtain any necessary command codes for the device, Alternatively, the user 120 may initiate the broadcast for unregistered sources instead of having the WHEH 102 perform a periodic broadcast for unregistered sources. For example, when a user 120 adds a new component or device to the HES 100, a request to find unregistered sources may be initiated, such that once the request is initiated, the remaining registration procedure proceeds automatically as discussed above.

In an alternate embodiment, the WHEH 102 may automatically recognize and register all devices in the HES 100. For example, a user 120 may purchase a set of coordinated devices for wireless HES 100 including, for example, a display, set of multi-channel speakers, a DVD player 104, and a WHEH 102 (which may be a discreet device or contained in one of the system devices, such as the display or remote control). Each of these coordinated devices may contain a coordinated ID that is recognizable by the WHEH 102. Additionally, the speakers may be labeled with their intended position within the HES 100 (e.g., front left, middle right) to aid the user 120 in their correct placement. Upon placement and power-up, without any additional actions by the user 120, the WHEH 102 automatically registers the coordinated devices based on their coordinated ID's that have been set by the device manufacturer.

The wireless HES 100 may perform an error checking during the registration of the source and sink devices to make sure that the device being registered matches the type of device being requested for registration. The WHEH 102 can compare the list of capabilities received from the device during the registration with a list of expected capabilities stored in the WHEH 102. If the capabilities in the device reply match the expected capabilities of the WHEH 102, an indication of the registration is stored in the WHEH 102 and the device. If the capabilities and expected capabilities do not match, the registration is not stored and may be re-initiated.

Manual Registration

The registration may also be performed manually by the user 120 (see FIG. 4). The user 120 initiates a registration procedure by pressing a registration actuator on the WHEH 102. Examples of actuators include buttons, touch pads, touch screens, or any other actuating assembly recognized by those skilled in the art. The user 120 presses a registration actuator on a selected source unit which sends a signal to the WHEH 102 that a registration should be stored with this unit. If the WHEH 102 is unable to determine the functionality of the source (e.g., DVR, DVD, etc), the user 120 may manually assign the functionality of the source to complete the registration. For example, if the user 120 selects the registration actuators on the WHEH 102 and the DVD player 104, the WHEH 102 may cause "DVD registered" to be displayed if the selected source is recognized as a DVD player 104 by the WHEH 102. If the selected source is not recognized, the WHEH 102 may prompt the user 120 to select the type of source device from a list. Thus, in this case, the user 120 may select "DVD" in order to complete the registration. This process is repeated until all the unregistered sources have been registered with the WHEH 102, or similarly if a new source is added into an existing system. In other embodiments, the user 120 may initiate registration from a source device 122, a sink device 124, a remote control 118, or over a network.

Multi-Instance Device Registration

For device types where multiple instances of the device exist within the system 100 (e.g., speakers 110), a number of approaches can be used to identify each device's specific role. For speakers 110, the role of each speaker can be pre-identified by the manufacturer (e.g., "front-right", "subwoofer", etc.). The user-initiated automatic registration procedure described above could be used to register the speakers 110 with the WHEH 102 since the speaker 110 could identify itself, for example, as the front left speaker, during the registration process. Alternatively, each speaker 110 could have a physical input that the user 120 could set to indicate the speaker's role (e.g. "front-left", "back-right-surround"). In another embodiment, the WHEH 102 could use one or more microphones within the HES 100 to elicit position and frequency response information, or the HES 100 could use other position detection technologies understood by those skilled in the art.

Figure 14:
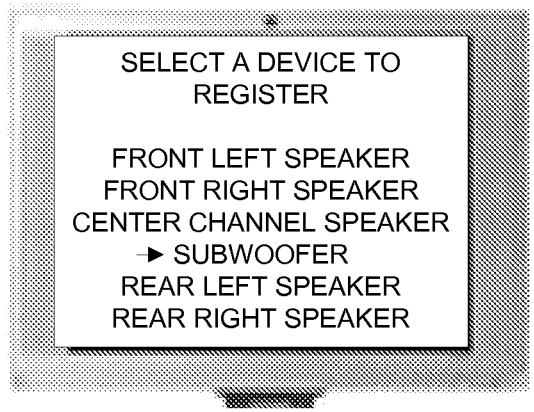
FIG. 14 illustrates a series of exemplary user interface display device screens for registering speakers in accordance with the home entertainment system of FIG. 1.
Figure 14:
Figure 14:

In another embodiment, each speaker 110 could have a registration actuator to be activated in response to a WHEH 102 prompt for a speaker playing a specific role. For instance, the WHEH 102 could prompt the user 120 for the front-left speaker and the user 120 could activate the registration actuator. Alternately, the user 120 may initiate the registration procedure by activating a registration actuator on the WHEH 102. The user 120 then presses a registration actuator on a speaker 110 and identifies the functionality of that speaker 110 within the audio system 100. For example, at the time of registration, the user 120 identifies the selected speaker as the left front, the repeats for right front, continuing until all the speakers 110 have been identified and registered. In one embodiment, the WHEH 102 may prompt the user 120 with a list or graphic display of speaker positions available as shown in FIG. 14. The user 120 first selects the speaker 110 to be registered and then presses the registration actuator on the selected speaker. In an alternate embodiment, the WHEH 102 may first prompt the user 120 to enter the number of speakers to be registered with the WHEH 102 and then select the appropriate speaker configuration to match. For example, if only four speakers 110 are selected, the WHEH 102 would not present the user 120 with a Dolby® Digital 7.1 speaker configuration, but a four speaker list of left and right front, and left and right rear.

Figure 15:
FIG. 15 illustrates a series of exemplary user interface display device screens for showing missing devices in accordance with the home entertainment system of FIG. 1.
Figure 15:
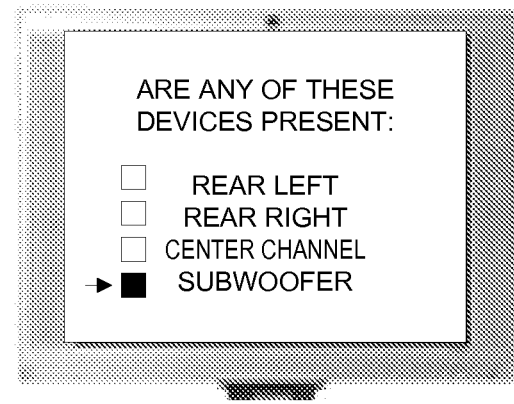
Figure 15:

After device registration is complete, the WHEH 102 may compare the list of source devices 122 and sink devices 124 registered with the WHEH 102 to a list of possible types of source devices 122 and sink devices 124 that can be registered with the WHEH 102. Using the display device 112, the WHEH 102 may present to the user 120 a list of device types that are missing from the HES 100. The user 120 can indicate whether one or more of the listed device types are present in the HES 100, indicative of an error in the registration procedure. These devices can then be registered with the WHEH 102 using any appropriate method described above. For example, after registering all the detected devices in a HES 100, the WHEH 102 determines that a gaming console 108, a DVR, and a subwoofer are missing device types within the HES 100. A list of these missing device types is displayed on the HDTV. The user 120 inputs that the subwoofer is present in the HES 100. After the subwoofer is successfully registered, the user 120 is presented with a list of gaming console 108 and DVR as the missing device types. Referring to FIG. 15, in one embodiment, the WHEH 102 may present the user with a list of devices missing in the HES 100 based on requirements to fully support playback of program content. For example, if a DVD program contains a 5 channel audio track, but only two speakers, front left and front right, are registered with the WHEH 102, the WHEH 102 may display an indication to the user 120 that a rear left, rear right, center channel and subwoofer may be added to the HES 100 to enhance the audio experience of the user 120.

Once the WHEH 102 has determined a list of missing device types, the WHEH 102 may then cause advertisements for the missing devices to be displayed to the user 120 on the display device 112. The advertisements may be generic advertisements for the missing device type or may be sponsored advertisements for a specific brand of the missing device. Advertisements may be stored on the WHEH 102 or received from programming channels accessible using the STB 106. Alternately, the advertisements may be retrieved from a computer network (e.g. the Internet) through a direct connection of the WHEH 102 to the computer network or via a PC 114 connected to the computer network and registered with the WHEH 102. For example, the WHEH 102 determines that no DVR is registered with the WHEH 102. The WHEH 102 transmits an advertisement for a DVR stored in the WHEH 102 to the display device 112 for presentation to the user 120 just after the user 120 has initiated the entertainment session and before displaying the requested programming. Alternately, the WHEH 102 may insert advertisements into the programming by replacing an advertisement from the programming stream with an advertisement for the missing device or device type. For example, if a gaming console 108 is determined to be missing, the WHEH 102 may detect an advertisement for a gaming console 108 on a programming channel received on the STB 106. The WHEH 102 stores the advertisement for the gaming console 108 and replaces advertisements in the regular programming stream with the stored advertisement for a gaming console 108.

The presentation of the advertisement may be repeated for a predetermined length of time (e.g. for 4 weeks) or until the missing device is registered with the WHEH 102. The insertion of advertisements for missing devices or device types may also be limited to a range of dates and/or times. For example, advertisements for gaming consoles 108 may be presented to the user 120 from the middle of November until the end of December to correspond to a holiday shopping season. Alternately, the insertion of the advertisements may be based on an identification of the user by the WHEH 102.

Source Selection

Referring generally to FIGS. 2, 5-7, in addition to coordinating the registration of device within the HES 100 as described above, the WHEH 102 is also used to coordinate and/or control the state of the source and sink devices and the transfer of data from the source devices to sink devices during typical operation of the HES 100. Device states (also referred to as modes) may include "on", "off", "active", "low power", "standby", etc. Data may include instructions, audio/video programming, or any other information generally passed between or among source/sink devices. Some examples of typical operations that are common in the general utilization of the HES 100 by the user 120 are a request or action by the user 120 to activate a source (e.g., start watching programming from a cable broadcast) or initiate a change from one source device to another (e.g., discontinue watching programming from a cable broadcast to watching a movie on the DVD player). The request to activate a source device or to change from one source device to another can be accomplished in a several ways. The user may initiate the action though the use of the remote control 118, or interact directly with a source device. For example, when a user inserts a DVD into the DVD player 104, it automatically causes the WHEH 102 to activate the DVD player 104 (or initiate a source change as described below if another source is already active in the HES 100). In either case, once the request has been made by the user 120, the WHEH 102 completes the process as described below.

Figure 5:
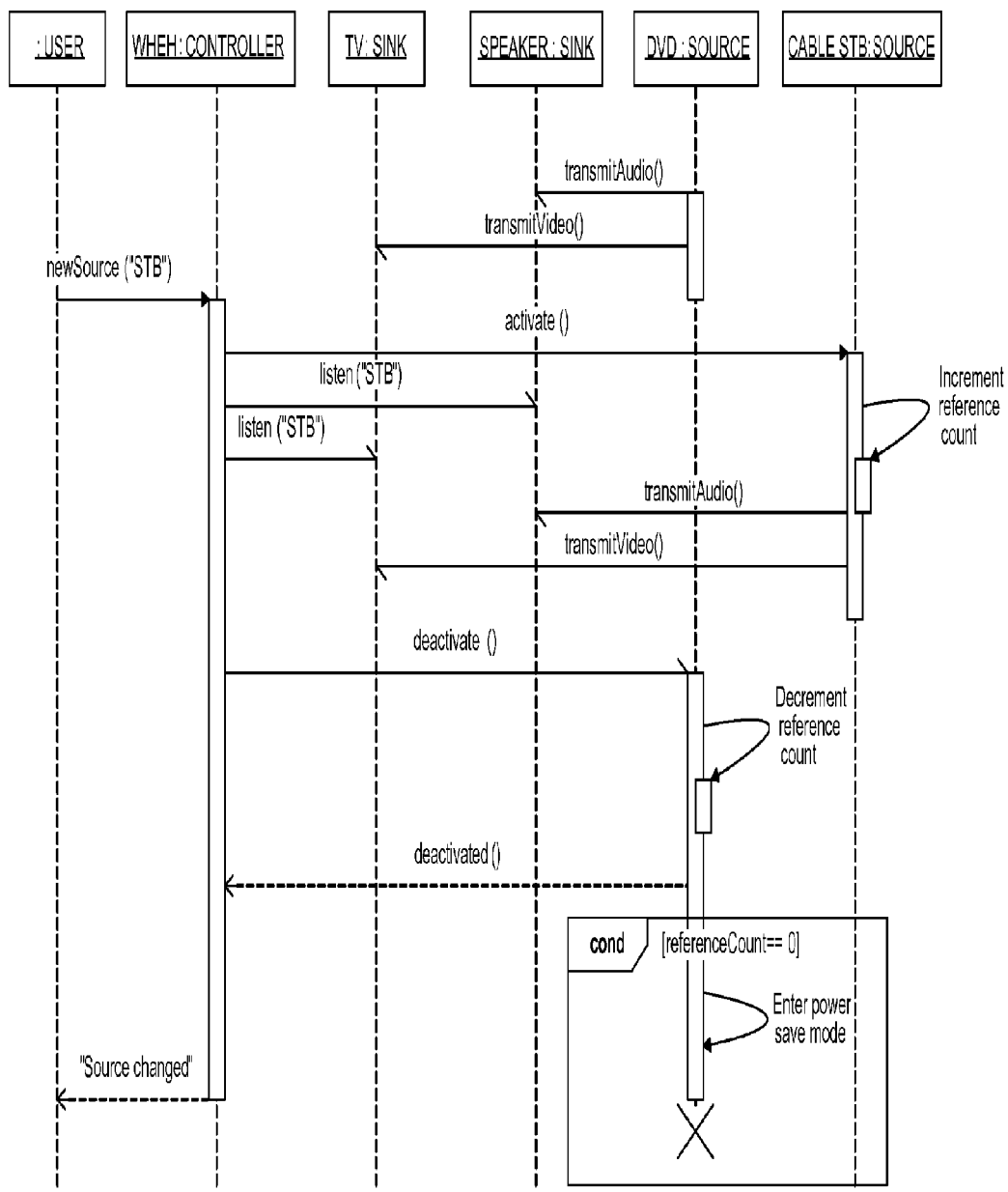
FIG. 5 is a sequence diagram of source activation in accordance with the home entertainment system of FIG. 1.

FIG. 5. is sequence diagram showing the selection of a source device 122 by the WHEH 102 in one embodiment of the HES 100. When a source device is activated, it begins transmitting data to the HES 100. The instruction to activate also causes an internal reference count within the source device to increment by one, where the reference count represents the current number of zones (described in more detail below) that are receiving data from the source device For example, if the source device, currently in standby mode, is activated, its reference count increases to one. After a user 120 initiates a request to change to a new source, the WHEH 102 instructs the current active source device to decrement its internal reference count by one. When the active source device internal reference count is zero, the source device may stop transmitting and enter a low power or stand-by mode. If the internal reference count is not zero, the source device continues to transmit since there are other devices still listening to its transmission. The WHEH 102 then instructs the newly selected source unit to activate, including increasing its internal reference count by one, and the newly selected source device begins transmitting data to the HES 100. The sink devices may receive the transmitted data directly from the current active source or from the WHEH 100, both described below. In an alternate embodiment, a list of the sink devices 124 in one or more zones of the HES 100 that are listening for data from the source device 122 is stored in the source device 122. Sink devices 124 are added or removed from the list as directed by the WHEH 102. When there are no sink devices on the list, the source device may stop transmitting and enter a low power or stand-by mode.

Direct Source to Sink Data Transmission

Figure 6:
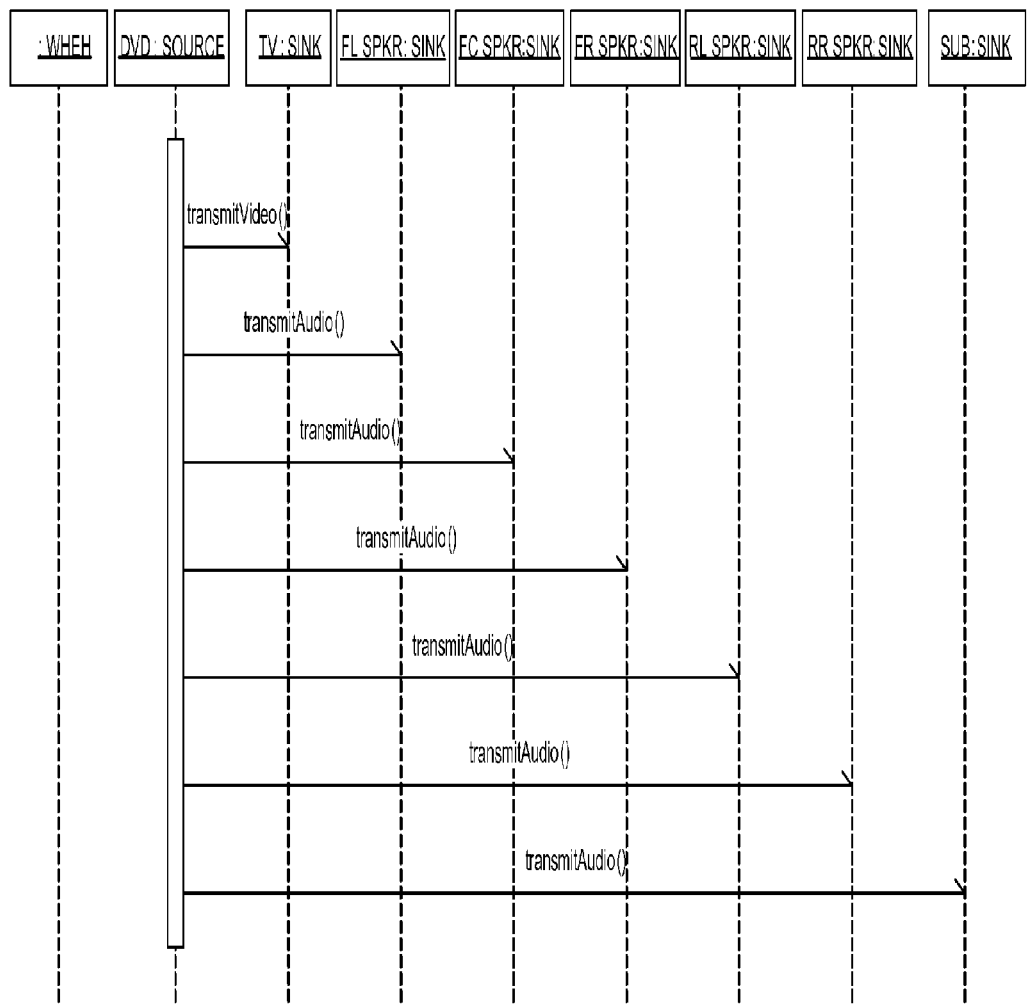
FIG. 6 is a sequence diagram of direct source to sink transmission of data within the home entertainment system of FIG. 1.

Referring to FIG. 6, after a source activation or change is initiated within the HES 100 as described above, the WHEH 102 broadcasts to all sink units, or those that are relevant, an instruction to discontinue receiving and transmitting data from the previously active source and begin receiving the transmitted data from the newly selected source, where the activities in FIG. 6. labeled "transmitVideo( )" and "transmitAudio( )" represent a continuous stream of data from the source device 122 to the sink devices 124. This instruction from the WHEH 102 may be broadcast as a single instruction to all units (i.e., a common instruction recognizable by any device in the HES 100) or may be a distinct instruction sent to each of the sink units. Audio and/or video data from the current active source device is transmitted directly to the relevant sink devices as instructed by the WHEH 102. For example, the display device 112 and speaker 110 receive and present the video data and audio data, respectively, from the current active source device. In one embodiment, the newly selected source device that has been activated in the HES 100 may transmit one or more instructions directly to the sink units to begin receiving and presenting the data from the newly selected source and discontinue presenting the data from the previously active source.

Source to Sink Data Transmission Through the WHEH

Figure 7:
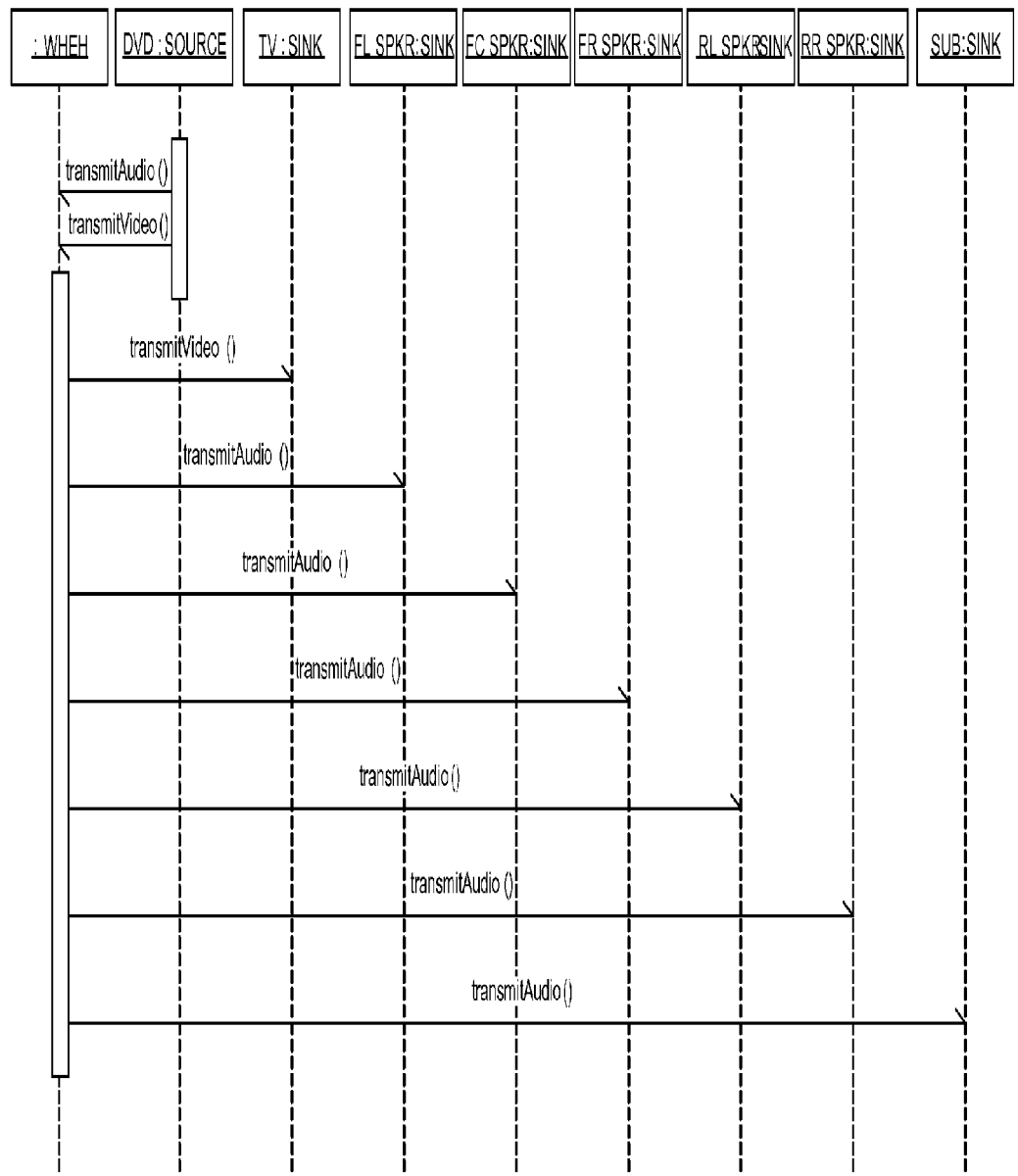
FIG. 7 is a sequence diagram of transmission of data directed by the wireless home entertainment hub within the home entertainment system of FIG. 1.

In an alternate embodiment, the sink units in the HES 100 receive data from the wireless home entertainment hub (see FIG. 7). The WHEH 102 receives the audio and video data from the current active source device and transmits the audio and video data to the appropriate sink unit. If a source change is initiated within the HES 100 as described above, the sink units may be unaware of a change of source with the HES 100 since they always listen to (i.e., receive data from) the WHEH 102, and not directly to the active source device.

In one embodiment, more than one source can be designed as an active source by the WHEH 102. Data from multiple active sources can be simultaneously presented by the relevant sink devices as described by the two methods above. The WHEH 102 receives the data from the two or more active source devices and transmits the data to the relevant sink devices. The WHEH 102 may process (e.g., mix) the data from the two or more source devices before transmitting. Alternately, the WHEH 102 may instruct the sink devices to listen to and present data transmitted directly from the two or more active sink devices.

Figure 8:
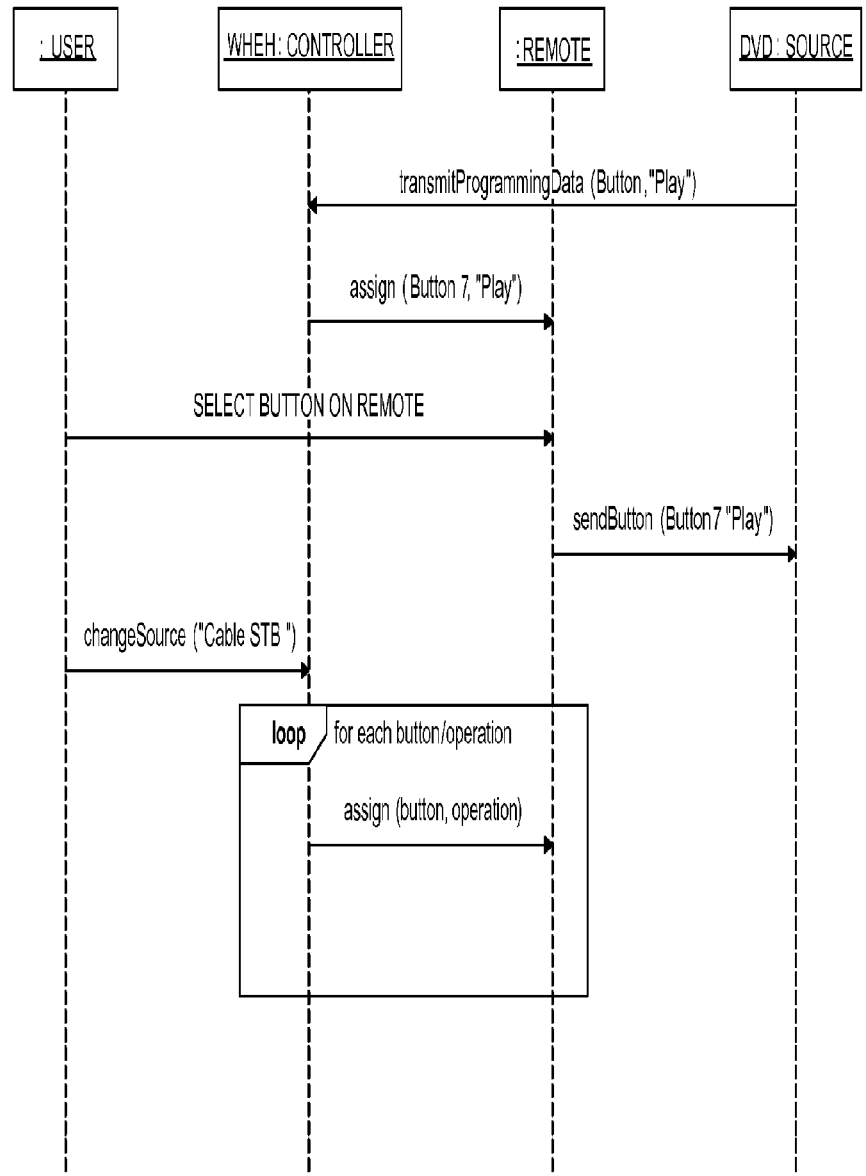
FIG. 8 is a sequence diagram of operation of a remote control in accordance with the wireless home entertainment system of FIG. 1.

Referring to FIG. 8, in one embodiment of the present invention, a remote control 118 is used with the HES 100. The remote control 118 receives actuator assignments based on the currently active source in the HES 100 from the WHEH 102. For example, if the DVD player 104 is currently the active source, the actuator assignment on the remote control 118 is for the DVD player 104. When a user 120 activates an actuator on the remote control 118, the actuator selection is sent directly to the DVD player 104, which responds with the corresponding activity for that actuator. If the user 120 initiates a source change through the WHEH 102 as described above, (e.g. from the DVD player 104 to the set-top tuner), then the WHEH 102 sends a new actuator assignment to the remote control 118 for the set-top tuner. Actuators activated on the remote control 118 by a user 120 now cause an activity in the set-top box instead of the DVD player 104. This method of operation of the remote control 118 is referred to a "dumb" remote. The functionality of the actuators on the remote control is controlled by the WHEH 102 based on the current active source in the HES 100. The remote does not need to store any information about past or present states of the HES 100 or registration information between the devices in the HES 100.

In an alternate embodiment, a "smart" remote may be used in conjunction with the HES 100. The smart remote learns and stores the system configuration, i.e., what source and sink devices are registered with the WHEH 102. It also learns and stores the current state of the system, i.e., what sources and sinks are active. In addition, the smart remote stores the actuator assignments in an internal memory and may store system status information along with device registration information. When a user 120 requests a source change using the remote, the WHEH 102 activates the new source as describe above, and the functionality of the remote control 118 is switched to controlling the newly active source without any input from the WHEH 102 to re-assign the actuators as described in the dumb remote case above. In one embodiment, the WHEH 102 may be contained in the smart remote instead of the display device 112.

A handheld mobile device, such as cellular phone or personal digital assistant, can use appropriate wireless capabilities to communicate with a WHEH 102, obtain information to build and present a user interface, and serve as a remote control 118 for the HES 100. In addition, the capabilities of the HES 100 may be used to enhance the functionality of the handheld mobile device. For example, when a cellular phone is active the remote control 118, the active display device 112 may display CallerID information or other information generally presented on the cellular phone display to the user 120 during an incoming telephone call.

The WHEH 102 may respond to voice commands. A user 120 can perform some or all of the functionality of the remote control 118 by using simple audible commands. For example, to change the STB to channel 21, the user 120 might say "Channel 21" and the WHEH 102 sends the corresponding instruction to the STB to complete the channel change, or use the command "Volume Up" increase the system volume, where the WHEH 102 send instructions to the active sink unit to increase volume.

In one embodiment, the WHEH 102 may respond to physical gestures made by the user 120 with the remote control 118. A user can provide instructions to the WHEH 102 corresponding to a predetermined set of physical motions of the remote. The remote control 118 may include a motion sensing system that can relay motion information in up to 3-dimensions to the WHEH 102. Additionally, the WHEH 102 or remote control 118 may include directional sensors to determine the orientation of the remote control relative to the HES 100 or sense rotation. Such motion sensing systems and directional sensors are understood by those skilled in the art. For example, a user wishing to switch from watching the DVD player to the STB 106 may simply point the remote at the STB 106, actuating an actuator on the remote control 118 to select a programming channel. Alternately, channel selection may be accomplished by a quick series of left or right motions of the remote control, each left or right motion decrementing or incrementing, respectively, the channel displayed by the STB 106. Volume control may be accomplished, for example, by a vertical motion of the remote control 118 directed at the display device 112 or speakers 110. In this manner, the volume of each speaker can be adjusted independently of the other speakers. In one embodiment, gestures may be used to move presentation of video content from one display device to another, engage picture-in-picture functionality, or perform other manipulations.

Power Management

At startup of an entertainment session, a user 120 may direct a power-on message to the WHEH 102, via a remote control 118 or perhaps via an actuator on the WHEH 102 or device containing WHEH 102 functionality. The WHEH 102 can then retrieve input from the user 120 regarding the capabilities required for the session and send activation messages to appropriate devices.

In another embodiment, a source device 122 can send a broadcast message to the sink devices 124 in the home entertainment network indicating required presentation capabilities. Required devices can activate themselves and unneeded devices can enter a low-power state. For example, all devices in the system are in a lower power mode. The user inserts a DVD into the DVD player 104 which causes the DVD to become active. The WHEH 102 detects the activity of the DVD player 104 and instructs the display device 112 and speakers 110 to activate. Alternately, the display device 112 and speakers detect the activity of the DVD player 104 directly and activate.

In one embodiment, upon indication from the active source device of the required audio output channels, the WHEH 102 sends signals to the audio sink devices to indicate whether or not they should remain active. For instance, upon indication of a Dolby® Digital 2.1 program, the WHEH 102 may communicate to the side and rear speakers that they may enter a low power mode. Similarly, when an audio-only program is indicated, for example from the CD player, the WHEH 102 can communicate to the video display device 112 that it may enter a low power non-display state.

Devices in the HES 100 may contain low-powered radios (i.e., transceivers) that poll for activity or constantly monitor for WHEH 102 messages during a low-power device state. Wireless radios conforming to the "ZigBee" standards can be used in some embodiments. "Bluetooth" or "WiFi" radios can be used in other embodiments. Modes of "UWB" can also be used to detect communications during low-power operations.

Volume Control

Volume control, including system muting, can be accomplished in multiple ways. In one embodiment, all active audio sink devices may individually detect that the remote control 118 has transmitted an instruction to change the volume. For instance, the eight speakers of a 7.1 surround sound system each detect a "volume up" instruction transmitted from the remote control 118. Each speaker then increases the gain on its internal amplifier, thereby driving the speaker to higher volume. Alternatively, the WHEH 102 can detect an instruction from the remote control 118 requesting a volume change and transmit to all the audio sink devices one or more instructions to change their volume.

System Calibration

Figure 16:
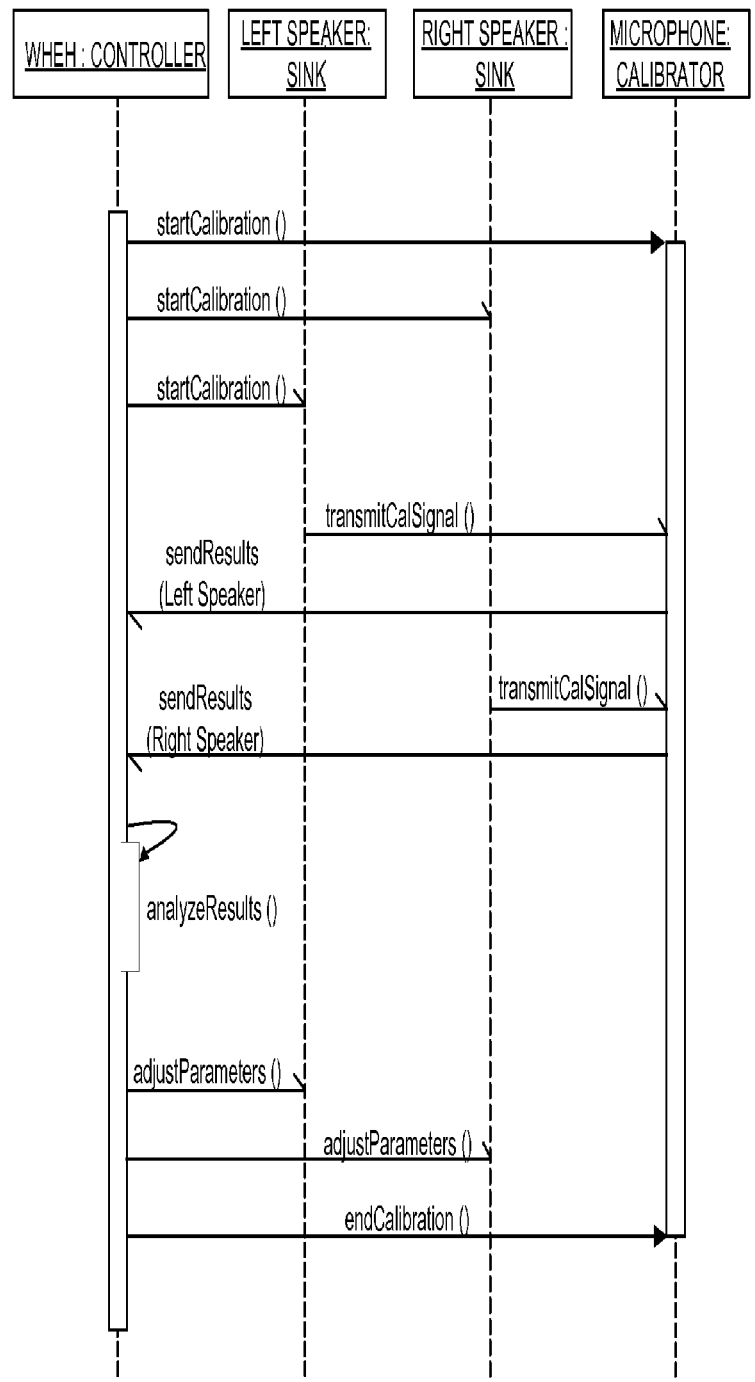
FIG. 16 a sequence diagram of an audio calibration procedure using the wireless home entertainment hub in accordance with the home entertainment system of FIG. 1.

For calibration of the HES 100, a wireless calibration device 116 may be placed at a typical viewing and/or listening position 121 (e.g., near or on a chair or couch that a user 120 would sit to view the television) of the HES 100 by the user 120 (see FIG. 1). Referring to FIG. 16, for audio calibration, the WHEH 102 can direct a calibration signal to each audio device in sequence or in combination, or each audio device can be directed to generate its own calibration program. A microphone in the wireless calibration device 116 monitors the calibration signals from the audio devices, and can communicate its readings to the WHEH 102 or back to the audio devices in a point-to-point or broadcast mode. Adjustments can then be made to the frequency characteristics, volume, or other parameters to provide a calibrated home theater environment. Similarly, a wireless light sensitive device can be used to monitor a calibration signal from one or more display devices 112 to provide video calibration of the system. In one embodiment, the microphone and light sensitive device may be contained in a single calibration unit. Alternately, the microphone and light sensitive may be contained in separate calibration units. In one embodiment, an actuator on the microphone device can cause the device to communicate with the hub to initiate the calibration sequence.

A/V Receiver

Figure 9:
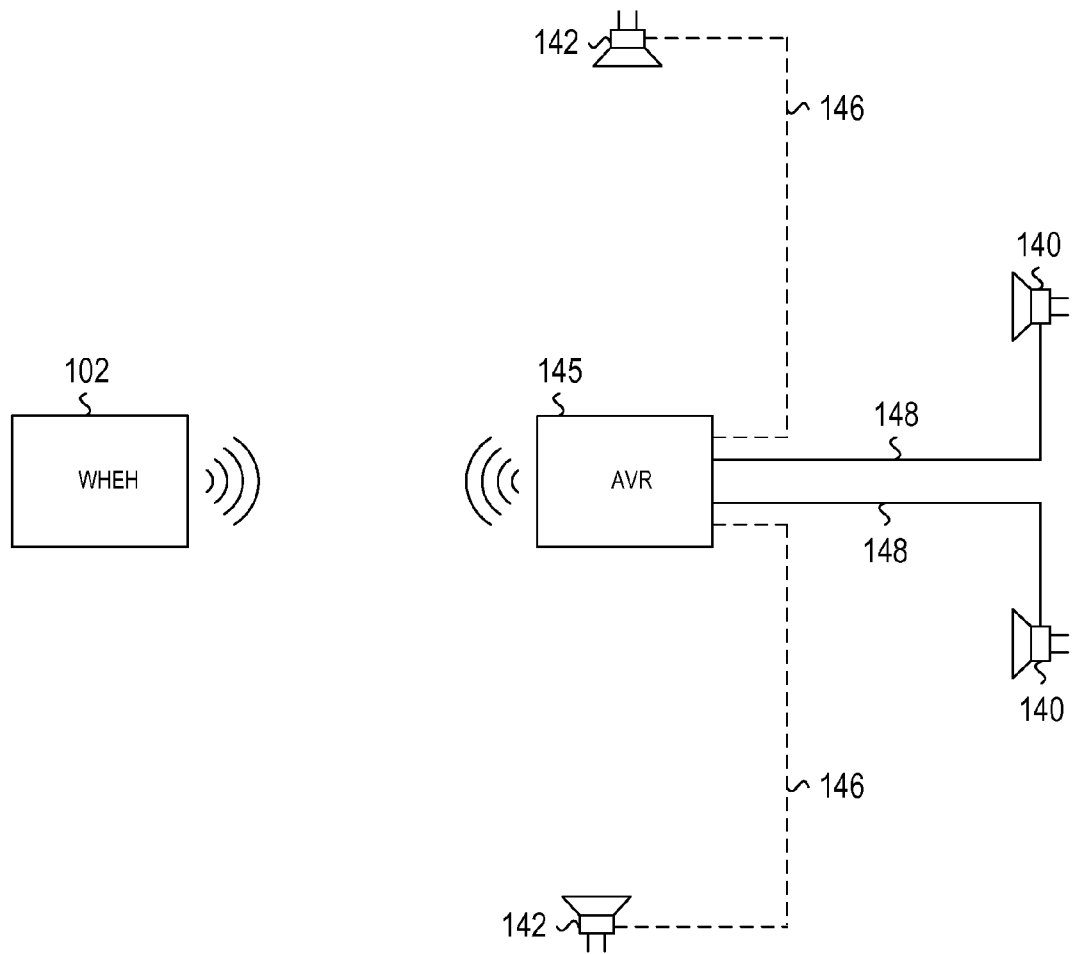
FIG. 9 is a system diagram of an audio/visual receiver used to connect speakers to the wireless home entertainment hub of FIG. 1.

Referring to FIG. 9, one or more audio/visual receivers (AVR) 145 or amplifiers can be used to connect the HES 100 to speaker system. The speaker system may be wired 140, wireless 142 or a combination thereof. For example, the front speakers 142 in a four speaker system may be wirelessly connected 146 to the AVR 145, while the rear speakers 140 are connected by a wire 148 to the AVR 145. The AVR 145 is registered with the WHEH 102 and receives audio data from an active source (not shown) or through the WHEH 102, as described above. The AVR 145 transmits the received audio data to the appropriate speakers 140, 142, either through the wired connection 148 or by wireless communication 146. It should be noted that if the AVR 145 is configured for use with wireless speakers 142, these wireless speakers 142 are not registered with the WHEH 102 as described above and do not receive data from the WHEH 102 or source devices 122 in the HES 100, but instead communicate with the AVR 145 using methods understood by those skilled in the art.

Legacy Adaptor

Figure 10:
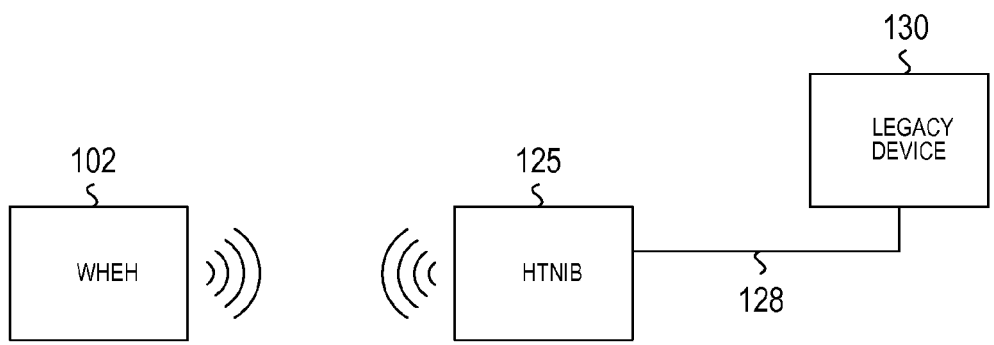
FIG. 10 is a system diagram of a wireless network interface box used to connect non-wireless enabled devices to the wireless home entertainment hub of FIG. 1.

Referring to FIG. 10, a home theatre network interface box (HTNIB) 125 may be used to connect "legacy" devices 130 into the HES 100, including the WHEH 102. Legacy devices generally include those devices that require hardwire connection for transmission and/or receipt of data and are not wireless enabled (e.g., an analog television connected to a set-top box using coaxial cable), although a wireless device may also be considered a legacy device if the wireless device can not be configured to communicate with the wireless home entertainment hub. The legacy device is connected to the HTNIB 125 using a hardwire connection 128 (e.g. coaxial cable). The HTNIB 125 is capable of being registered with the WHEH 102, and recognized by the WHEH 102 as the legacy device to which it is connected. The WHEH 102 directs data to and/or from the HTNIB 125 as appropriate to the type of legacy device to which the HTNIB 125 is connected. The HTNIB 125 passes data to and/or from the connected legacy device as required by the current configuration of the HES 100. If a legacy source device outputs data in either an analog format or a digital format different than that used by the WHEH 102, the HTNIB 125 can convert the output data into a digital format compatible with transmission between the WHEH 102 and registered devices within the HES 100. Similarly, if the HTNIB 125 is connected to a legacy sink device, the HTNIB may convert the digital data from the source device into either an analog format or a different digital format compatible with the legacy device. For example, if a video cassette recorder (VCR) is connected to the HTNIB 125, the WHEH 102 will recognize the NTNIB 125 as a VCR, and when the user 120 selects the source unit VCR, will instruct the sink devices 124 in the HES 100 to listen to the transmission from the NTNIB 125, which is transmitting the data received from the cable connected to the VCR. One or more HTNIBs 125 could be used in the HES 100 to connect one or more legacy devices. In one embodiment, a single HTNIB 125 could used to connect one or more legacy devices to the HES 100, wherein the HTNIB 125 contains one or more connections for sink and source devices. Each connection can be uniquely registered with the WHEH 102.

Multi-Zone Operation

A single WHEH 102 may provide programming to multiple sets of sink devices that are registered with the WHEH 102. The HES 100 may be partitioned into one or more zones. Each sink device 124 in the HES 100 can be assigned to a zone. Zone assignment may be performed at the time of device registration with the WHEH 102. Zone assignment or changing zone assignments can also be accomplished at any time after device registration. An example of zone partitions within a HES 100 is that zone 1 includes the display device and 7.1 speaker system in the living room; zone 2 includes a display device in the bedroom; zone 3 includes an AVR 145 connected to speakers in the kitchen; and zone 4 includes a PC 114 in the home office. Multi-zone operation allows users 120 in different partitions of the HES 100 to received data from different source devices 122 registered with the WHEH 102. For instance, the sink devices in zone 1 are presenting the program from an HD-DVD, while the speakers in the kitchen connected to the AVR 145 in zone 3 are presenting audio from a wireless music storage device that is also registered with the WHEH 102. Zone assignments can be designed by the user 120. Alternately, devices can be assigned to a zone in the HES 100 by the WHEH 102 based on determining the location of the device and identifying clusters of device as separate zones. The device locations may be input by the user during or after the time of device registration, or the WHEH 102 may automatically determine the locations of registered devices.

In one embodiment, the WHEH 102 can receive an audio source signal containing more channels than can be presented in the current HES 100 (e.g., the audio signal is configured for a 7.1 system, but the installed HES 100 utilizes a 5.1 speaker configuration.) The WHEH 102 can process and downmix the audio signal for presentation on the available speaker configuration. As described above, the WHEH 102 may also provide to the user 120 an indication that the audio signal contains more audio channels than the current configuration of the HES 100 can support, and recommend to the user 120 that additional speakers 110 be added to the HES 100 to fully support playback of such audio.

Programming or program content may include multiple video streams, which may also be referred to as side channels. One or more of the multiple video streams may be presented to the user 120 on the display device 112, depending on the configuration of the HES 100 (discussed in more detail below). As an example, a user may make a program selection from the offerings of a cable operator by tuning by tuning the STB 106 to "Channel 6". The program content received by the STB 106 from the cable operator may include multiple video streams, including the video stream with the program selection that the user has requested. The video stream with the requested program selection is displayed on the display device 112. The other video streams also contained in the program content received by the STB 106 may or may not be presented to the user 120, depending on the configuration of the HES 100, or preferences of the user 120.

Display devices 112 of the HES 100 may also be used as picture displays to show still images, instead of video programming, such as a flat panel LCD display mounted on a wall or free-standing on a table top. Multiple display devices used as picture displays may be placed throughout a home and assigned to zones of the HES 100 as described above. In one embodiment, display devices in the same room of a household may be assigned to different zones of the HES 100. The user 102 can coordinate the display of still images on the displays in each zone through the WHEH 102. The user 120 can set up a folder of images on a PC 114 registered with the WHEH 102, or use a pre-packaged gallery of images stored in the PC 114 or in the WHEH 102. The WHEH 102 can coordinate the display of the images in the various zones of the HES 100. The still images may be displayed for an extended period of time, such as favorite painting or landscape, or the displayed image may be changed periodically, such as showing a slideshow of family members. The WHEH 102 may cause the same still image to be displayed in all zones, or have a common theme, such as artist or subject, among all the images displayed in each of the zones. Images may be changed daily, seasonally, or at any predetermined interval. Such changes may be automatic determined by the WHEH 102 or may be manually triggered by the user 120.

Figure 11:
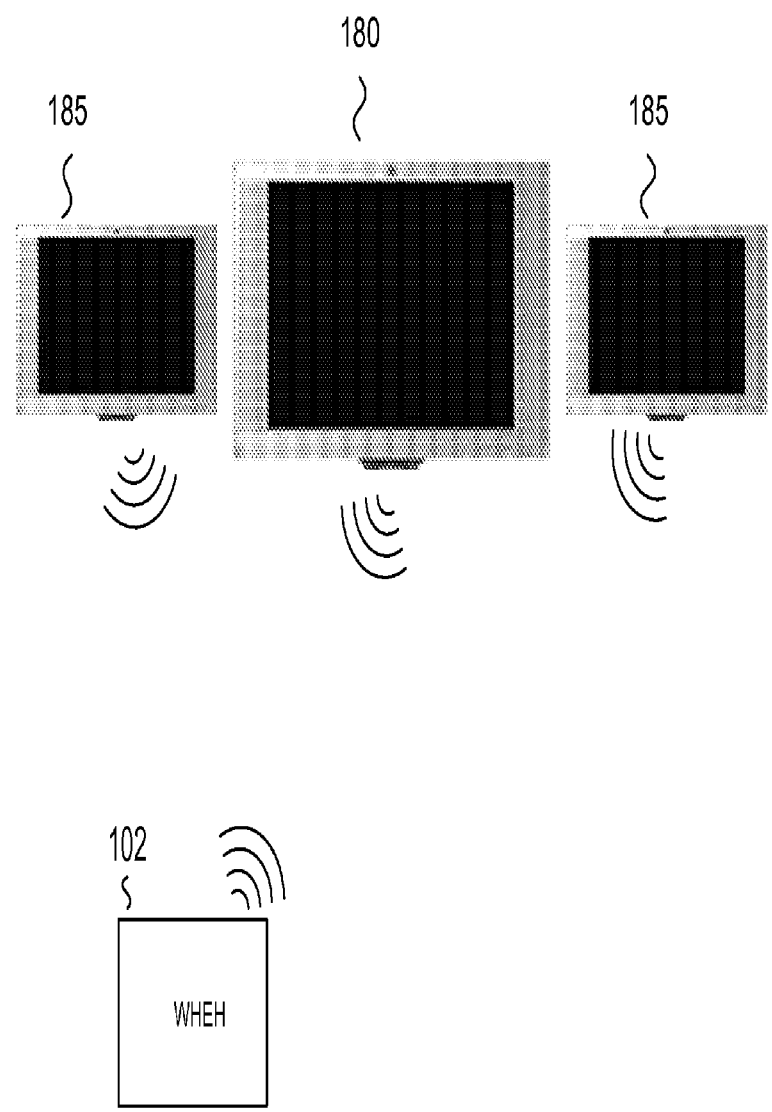
FIG. 11 is a system diagram of a multiple display device configuration in accordance with the home entertainment system of FIG. 1.

The HES 100 may also contain more than one display device 112 assigned to the same zone. Each display device 112 is registered with the WHEH 102 using one of the methods described above. The user may choose to designate one of the display devices 112 as the primary display device during or after registration of the display device 112, or alternately the WHEH 102 may automatically designate one of the display devices 112 as a primary display based on the characteristics of the display device, such a screen size or pixel density, with the other display devices being designated as secondary displays. For example, referring to FIG. 11, if a 51" HDTV 180 and two 32" HDTV's 185 are registered with the WHEH 102 and assigned to the same zone, the WHEH 102 may automatically designate the 51" HDTV 180 as the primary display based on larger screen size, while the 32" HDTV's 185 become the secondary displays. Secondary displays can be used to show supplemental program content that is complimentary to the main program content being displayed on the primary display. This supplemental program content may be encoded in the main program stream received from a content service provider, or may be transmitted as a separate program stream or side channel. Some examples of supplemental program content that may be shown on the secondary displays include viewer e-mails during a talk show, stock prices, financial, or other information about a company during a business report directed to that company, still images related to material presented during a documentary, and scores, playing schedules other team information during a sportscast related to that team. The secondary display may also present alternate views of an event during news reporting. For example, the on-location reporter is on the primary screen, while alternate video related to that location is shown on the secondary displays. The secondary display may also be used to display extra program content included on a DVD. For example, bloopers or directors commentary corresponding to the scene of a movie presented on the primary display can be shown on the secondary display. In one embodiment, the primary or secondary displays may be used to display content corresponding to a music program being presenting in the HES 100. The video content may be video or still images contained on a compact disc or received along with the music stream from a PC 114 or other music channel, such as terrestrial or satellite radio.

Screen captures from video being presented on the primary display may also be shown on the secondary display. If there is more than one secondary display, previous screen captures can be retained while subsequent screen captures can be shown on a different secondary display until all the secondary displays are displaying a different still image. The next screen capture then replaces the screen capture on the first display. For example, during a sporting event, a replay is being viewed on the primary HD-TV. The user 120 activates an actuator on the remote control 118 to indicate the current frame of the HD-TV display should be stored and displayed on one of the secondary displays. Alternately, the WHEH 102 can automatically initiate a screen capture from the primary display. Using the previous example of a sporting event replay, the WHEH 102 may detect a slow-motion replay in the video stream using methods understood by those skilled in the art and select a frame from the video to display on the secondary display. The frame might be selected based on a still or nearly still video image on primary display, or the frame might be selected based on a repeated showing of the video clip in a short predetermined time interval. As another example of automatic screen capture, a frame may be captured from the primary display at a random or predetermined interval and sent to the secondary displays for presentation to the user 120.

The secondary display may also be used to present advertisements concurrent with main program content shown on the primary display. The advertisements may be related to a product currently being featured in the main program content, such as for an automobile or a brand of food or drink.

The secondary display can present to the user 120 a website corresponding to an Internet address displayed on the primary display. The Internet address may be transmitted along with but separate from the program content and received by the WHEH 102, which detects the Internet address in the program stream and retrieves the content of the website using a network connection available within the HES 100. Alternately, the WHEH 102 may derive a web address shown on the primary display through OCR on frames formed from the program content of the main display, or the WHEH 102 may utilize other methods of character recognition understood by those skilled in the art. In one embodiment the user may browse the website presented on the secondary display using the remote control 118.

Figure 12:
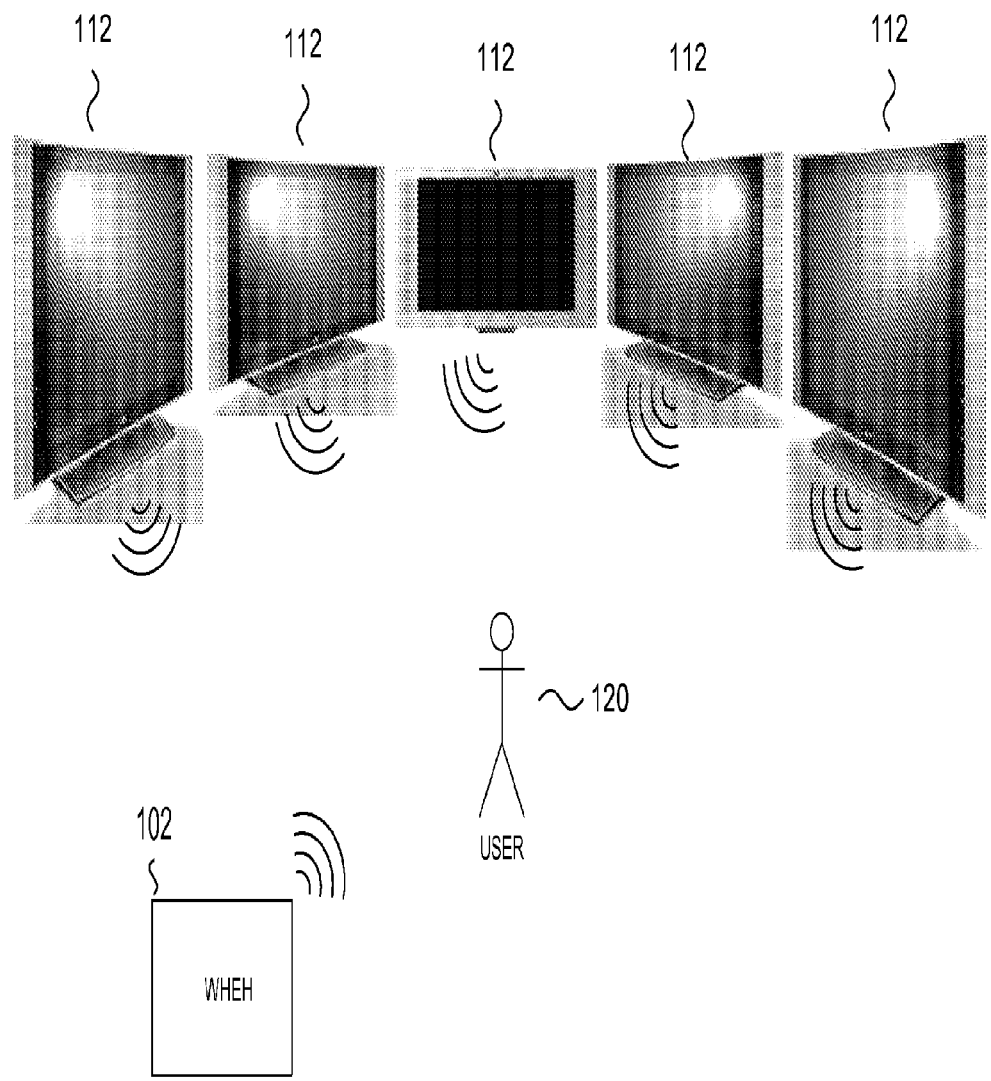
FIG. 12 is a system diagram of an implementation of using multiple display devices for a wide-angle display in accordance with the home entertainment system of FIG. 1.

Referring to FIG. 12, the HES 100 may contain a number of identical or nearly identical display devices 112 arranged to provide the user 120 with a wide angle video experience. In one embodiment, the display devices 112 may be arranged to completely encircle the user 120 providing a surround video experience. A source device 122 provides program content containing multiple video streams which, when displayed on the multiple display devices 112, provide a panoramic view of the program content to the user 120. The WHEH 102 may direct the source device to transmit each of the video streams to the appropriate display device. Alternately, the WHEH 102 may receive the transmission from the source device, and transmit the appropriate video stream to the corresponding display device 112. In an alternate embodiment, multi-stream video program content may be displayed on a single display device 112 by compositing the video streams by the WHEH 102 for display on a single device. For example, if program content contains data for three separate video streams that can be displayed to form a multi-display program, and the HES 100 contains only one display device, the WHEH 102 can composite the three video streams to be displayed on the one display device 112 in the HES 100.

Systems using a WHEH 102 can be supplied in a low-security configuration to ease installation by non-technical users. In an embodiment with higher security, the user 120 can enter a code on one device and confirm the code on another device or on the user interface. In another embodiment, various system components can ship with awareness of unique identifiers of other devices in the system.

The WHEH 102 may be used to wirelessly connect musical devices. Musical source devices and musical sink devices can be connected to a mixing board containing an advanced embodiment of the WHEH 102. Musical source devices include, but are not limited to, musical instruments, microphones, effects systems, and amplifiers. Musical sink devices include by are not limited to speakers, and audio monitors. The mixing board acts as both a sink unit and source unit, and is a convenient location for placement of the WHEH 102. The musical devices are all registered with the WHEH 102 similar to the produce procedure described above for the HES 100.

The WHEH 102 may detect and/or identify the specific user or users of the HES 100 through RFID, image capture and analysis, voice recognition, or other personal identification technologies understood by those skilled in the art. In one embodiment, the remote control 118 may be equipped with a fingerprint scanner used for identification of the user 120. The identification of the user 120 can be used to control access to various devices of the HES 100 based on a set of rules customizable for each user of the HES 100 by an authorized user (i.e., parent). For example, access to one or more devices can be denied based on time of day. Similarly, access to certain programming channels can also be denied based on a television program rating system, time of day, or selected channels. For example, users identified as children may not be allowed access to an Xbox® gaming console before 5 PM on weekdays or may not be allowed to view channels showing television programming rated TV-MA (under the US TV Parental Guidelines).

Characteristics of the HES 100 may be automatically adjusted based on identification of the user 120 by the WHEH 102. Characteristics of the HES 100 include physical characteristics, such as the height or orientation (e.g. rotation, tilt) of the display device or speakers, and system characteristics, such as volume or equalization of the audio, or channel on the STB 106. A profile may be stored in the WHEH 102 with information about the characteristics of the HES 100 corresponding to the user 120. The profile may be set by the user 120 or the WHEH 102 may store the last configuration of the HES 100 for each user 120 and return the HES 100 to that configuration when the user 120 begins an entertainment session. In one embodiment, the profile also contains information about positioning or adjustments of viewing location 121, such as a couch or chair equipped with automatic adjustment mechanisms understood by those skilled in the art.

Figure 17:
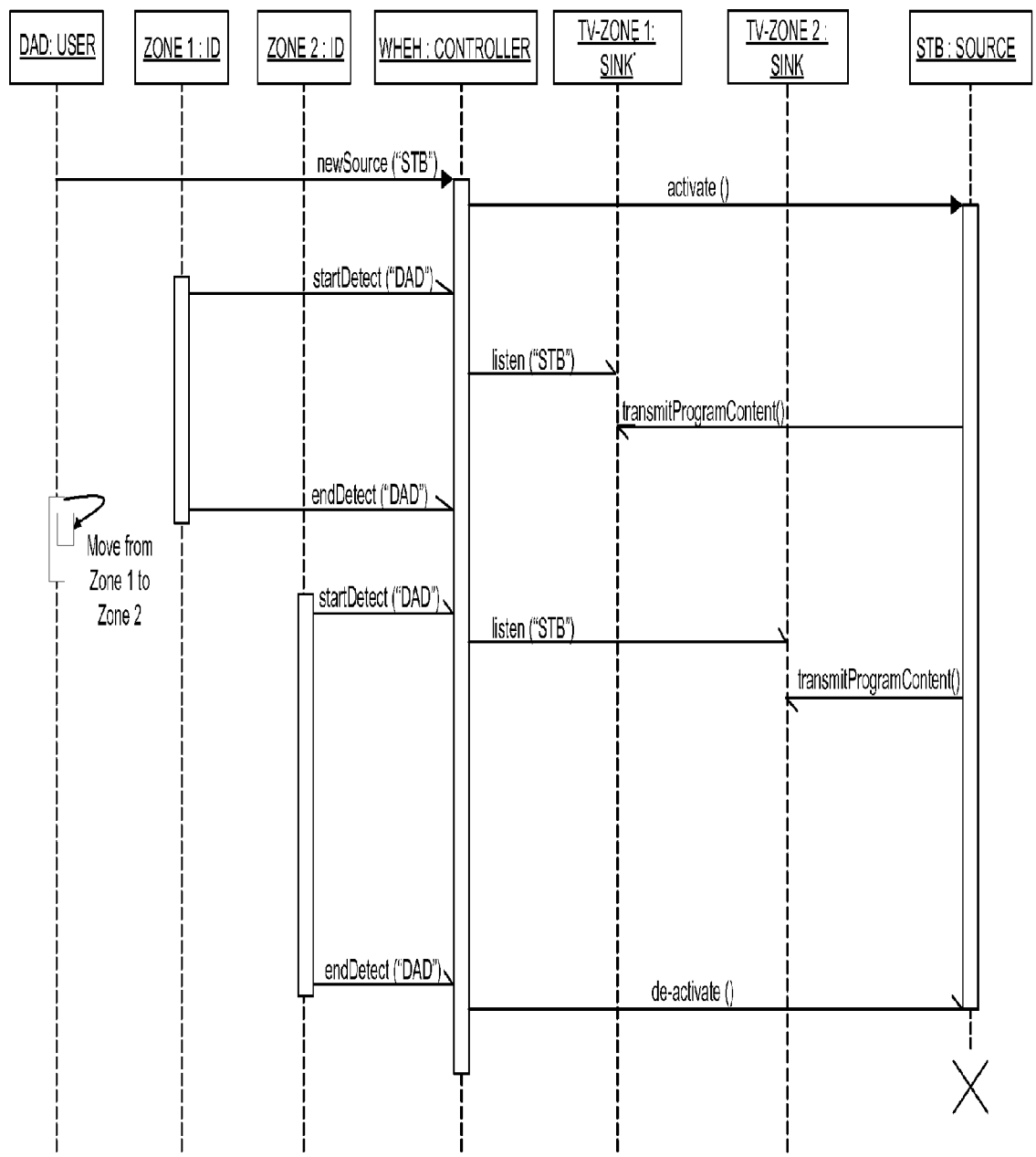
FIG. 17 a sequence diagram of re-directing program content by the wireless home entertainment hub based on movement of a user within the home entertainment system of FIG. 1.

Referring to FIG. 17, the movement of a user 120 in the HES 100 can be monitored by the WHEH 102 using personal identification technologies, such as those described above, so that the programming content presented to the user in one zone of the HES 100 can be automatically re-directed by the WHEH 102 to a different zone in the HES 100 as the user 120 moves into that zone. Personal identification devices located in the different zones of the HES 100 are used to detect the position of the user as the user moves from one zone to another within a zone of the HES 100. The position information is transmitted to the WHEH 102. The WHEH 102 then instructs the sink devices in the zone that the user has moved into to start presenting the program content. Thus, after a user 120 initiates an entertainment session in one zone of the HES 100, the program content from a source device 122 being presented to a user 120 by sink device 124 in a first zone of the HES 100 is directed to an appropriate set of sink devices in a second zone of the HES 102 by the WHEH 102. If the WHEH 102 detects that no users are present in the first zone, the WHEH 102 may instruct the sink devices in that zone to stop presenting the program content and enter a low power mode. In one embodiment, the WHEH 102 receives program content from a source device 124, and transmits that programming content to sink devices 124 in the zone where the user is located. For example, in a multi-zone HES 100 equipped with an RFID system, if the evening news is being viewed in the living room zone of the HES 100, and the user 102 identified using an RFID tag moves into the kitchen zone that includes a display device 112, the evening news program is automatically directed to the kitchen zone by the WHEH 102 when the RFID system identifies the user 102 in the kitchen zone and transmits the location of the user 102 in that zone to the WHEH 102. Audio program content can similarly be presented to a user 120 moving into different zones of the HES 100.

In one embodiment, the WHEH 102 automatically presents a user 102 with program content based on their location in the HES 100 and viewing and/or listening trends of the user. The WHEH 102 keeps a history of the programming choices of a user for different zones and different times, and can present the user with programming content based on these trends. For example, if a user typically watches a specific weather broadcast every morning around a certain time, the WHEH 102 cause that programming channel to be displayed in the zone that the user is currently located, even if the user has not requested to start an entertainment session to view that program channel.

Figure 18:
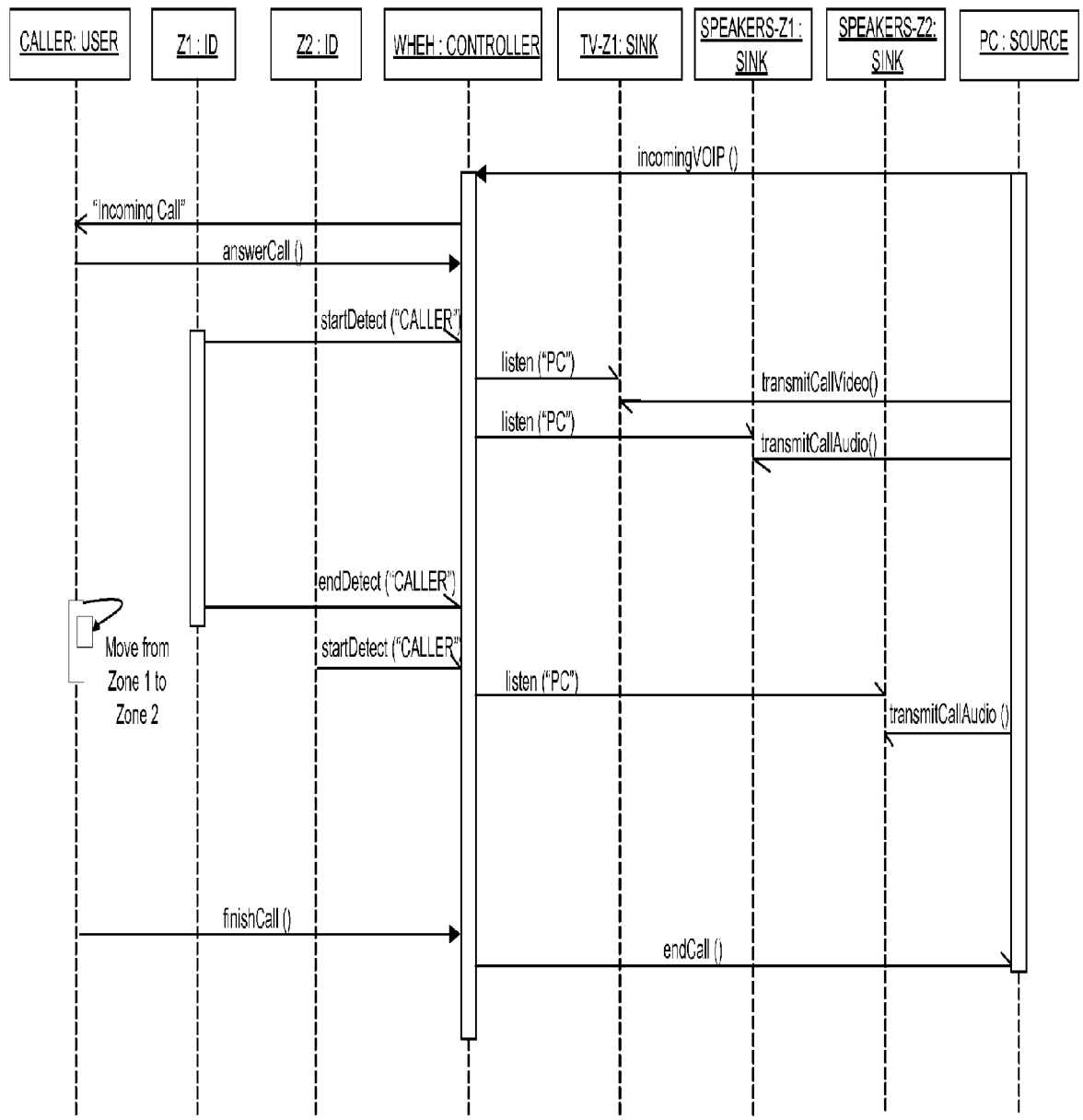
FIG. 18 a sequence diagram of re-directing voice-over-IP data by the wireless home entertainment hub based on movement of a user within the home entertainment system of FIG. 1.

The HES 100 may be used as an interface for a voice-over-IP protocol (VoIP). VoIP systems are well understood by those skilled in the art. The VoIP data may be received from a computer network (e.g. the Internet) through a direct connection of the WHEH 102 to the computer network or via a PC 114 connected to the computer network and registered with the WHEH 102. Referring to FIG. 18, when an incoming call is detected by the WHEH 102 or the PC has sent an indication to the WHEH 102 of an incoming call, the WHEH 102 sends an alert to the user 102. The alert may be a visual indicator on each display device 112 in the HES 100, and/or and audible tone from the speakers 110. The user accepts the VoIP call using the remote control device 118 or with a voice command. A microphone contained in one of the devices registered with the WHEH 102 is used as a receiver for voice, and the speakers are used to present voice data to the user 102. If the caller has webcam or other video capture device, the video data of the VoIP call can be presented in the display device 112. When alerted to a call, the user 120 may choose to pause or pre-empt the data being presenting in order to show video data from the caller. In one embodiment, the VoIP feature may utilize picture in picture technology for simultaneously displaying video VoIP data and video program content. The caller video can be displayed in a box inside the program content, or alternatively, the video call may occupy the main portion of the display, and the program content in the box. For conference calling, split screen may be used to display the video data for each of the callers. In a multi-zone HES 100 configured with multiple receivers, the WHEH 102 may transfer the voice data to sink device 124 in the different zones as the user moves around the HES 100. Tracking the position of the user may be accomplished through determining which microphone is closest to the user by monitoring relative intensity of the user's voice at the different microphones located in the HES 100. If video data accompanies the voice data, the WHEH 102 can direct the video to a display device 112 in user's current zone. In one embodiment, the a wireless VoIP phone handset is registered with the WHEH 102, where the handset is used to receive and dial calls in a manner similar to a standard telephone.

The embodiments of the present invention may be implemented with any combination of hardware and software. If implemented as a computer-implemented apparatus, the present invention is implemented using means for performing all of the steps and functions described above.

The embodiments of the present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present invention is not limited to the particular examples and implementations disclosed herein, but is intended to cover modifications within the spirit and scope thereof as defined by the appended claims and any and all equivalents thereof.

We claim:

1. A method of controlling a plurality of devices using a wireless home entertainment hub, the plurality of devices including a primary display device and at least one secondary display device, the method comprising:

transmitting, by the wireless home entertainment hub, video content to be displayed by the primary display device;

capturing, by the wireless home entertainment hub, a video frame in the video content being displayed by the primary display device;

transmitting, by the wireless home entertainment hub, the captured video frame to a first secondary display device to display;

recognizing, by the wireless home entertainment hub, an internet address displayed in the video content being displayed by the primary display device; and transmitting, by the wireless home entertainment hub, content from a website corresponding to the displayed internet address to a second secondary display device to display.

2. The method of claim 1, further comprising:

obtaining, by the wireless home entertainment hub, a registration with each of the plurality of devices, the registration preventing the plurality of devices from being registered with a different wireless home entertainment hub.

3. The method of claim 2, wherein the registration allows exchange of data between the plurality of devices and the wireless home entertainment hub, and facilitates a direct transfer of data between the plurality of devices in response to receiving instructions from the wireless home entertainment hub.

4. The method of claim 2, wherein the primary display device is assigned to a particular zone from a plurality of zones upon registration of the primary display device.

5. The method of claim 2, wherein the first and second secondary display devices are assigned to a same zone upon registration of the first and second secondary display devices.

6. The method of claim 2, wherein the first and second secondary display devices are located in a same room and are assigned to different zones upon registration of the first and second secondary display devices.

7. The method of claim 2 further comprising:

assigning each of the first and second secondary display devices to a particular zone from a plurality of zones of display devices upon registration of the first and second secondary display devices; and wherein transmitting content from the website corresponding to the internet address to the second secondary display device includes transmitting the content from the website to the second secondary display device upon detection that a user is in the particular zone.

8. The method of claim 7 further comprising:

receiving an indication of movement of the user to the particular zone from another zone.

9. The method of claim 1, wherein transmitting content from the website corresponding to the internet address includes retrieving the content from the website, by the wireless home entertainment hub via a network connection, prior to transmitting the content from the website to the second secondary display device.

10. The method of claim 1, wherein capturing, by the wireless home entertainment hub, the video frame in the video content further comprises:

capturing the video frame based on the video frame being repeatedly shown in the video content during a time interval.

11. The method of claim 1, wherein capturing, by the wireless home entertainment hub, the video frame in the video content further comprises:

detecting a plurality of video frames representing a slow motion replay of a portion of the video content; and capturing a particular video frame from the plurality of video frames representing the slow motion replay.

12. A method of controlling a plurality of devices using a wireless home entertainment hub, the plurality of devices including a primary display device, the method comprising:
   obtaining, by the wireless home entertainment hub, a registration with each of the plurality of devices, the registration preventing the plurality of devices from being registered with a different wireless home entertainment hub;
   assigning each of the plurality of devices to respective zones;
   transmitting, by the wireless home entertainment hub, video content to be displayed by the primary display device;
   capturing, by the wireless home entertainment hub, a video frame in the video content being displayed by the primary display device;
   transmitting, by the wireless home entertainment hub, the captured video frame to a first secondary display device to display;
   recognizing, by the wireless home entertainment hub, an internet address displayed in the video content being displayed by the primary display device; and
   transmitting, by the wireless home entertainment hub, content from a website corresponding to the displayed internet address to a second secondary display device assigned to a particular zone upon detection of movement of a user to the particular zone from another zone.

13. A wireless home entertainment hub characterized in that:
   circuitry is configured to transmit, by the wireless home entertainment hub, video content to be displayed by a primary display device of a plurality of devices;
   the wireless home entertainment hub is configured to capture a video frame in the video content being displayed by the primary display device;
   the circuitry is further configured to transmit the captured video frame to a first secondary display device to display;
   the wireless home entertainment hub is configured to recognize an internet internet address displayed in the video content being displayed by the primary display device; and
   the circuitry is further configured to transmit content from a website corresponding to the displayed internet internet address to a second secondary display device to display.

14. The wireless home entertainment hub of claim 13 further characterized in that:
   the wireless home entertainment hub is configured to obtain a registration with each of the plurality of devices, the registration preventing the plurality of devices from being registered with a different wireless home entertainment hub.

15. The wireless home entertainment hub of claim 14, wherein the registration allows exchange of data between the plurality of devices and the wireless home entertainment hub, and facilitates a direct transfer of data between the plurality of devices in response to reception of instructions from the wireless home entertainment hub.

16. The wireless home entertainment hub of claim 14, wherein the primary display device is assigned to a particular zone from a plurality of zones upon registration of the primary display device.

17. The wireless home entertainment hub of claim 14, wherein the first and second secondary display devices are assigned to a same zone upon registration of the first and second secondary display devices.

18. The wireless home entertainment hub of claim 14, wherein the first and second secondary display devices are located in a same room and are assigned to different zones upon registration of the first and second secondary display devices.

19. The wireless home entertainment hub of claim 14 further characterized in that:
   the wireless home entertainment hub is configured to assign each of the first and second secondary display devices to a particular zone from a plurality of zones of display devices upon registration of the first and second secondary display devices; and
   wherein the transmission of content from the website corresponding to the iternet internet address to the second secondary display device includes transmission of the content from the website to the second secondary display device upon detection that a user is in the particular zone.

20. The wireless home entertainment hub of claim 19 further characterized in that:
   the wireless home entertainment hub is configured to receive an indication of movement of the user to the particular zone from another zone.

21. The wireless home entertainment hub of claim 13, wherein the transmission of content from the website corresponding to the internet address includes retrieval of the content from the website, by the wireless home entertainment hub via a network connection, prior to transmission of the content from the website to the second secondary display device.

22. The wireless home entertainment hub of claim 13, wherein capture of the video frame in the video content further comprises:
   the wireless home entertainment hub is further configured to capture the video frame based on the video frame being repeatedly shown in the video content during a time interval.

23. The wireless home entertainment hub of claim 13, wherein capture of the video frame in the video content further comprises:
   the wireless home entertainment hub configured to detect a plurality of video frames representing a slow motion replay of a portion of the video content; and the wireless home entertainment hub is further configured to capture a particular video frame from the plurality of video frames representing the slow motion replay.

* * * * *